US010891585B2

(12) United States Patent
Sewak

(10) Patent No.: US 10,891,585 B2
(45) Date of Patent: Jan. 12, 2021

(54) COGNITIVE FASHION-ABILITY SCORE DRIVEN FASHION MERCHANDISING ACQUISITION

(71) Applicant: International Business Machines Corporation, Armonk, NY (US)

(72) Inventor: Mohit Sewak, Pune (IN)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 16/438,822

(22) Filed: Jun. 12, 2019

(65) Prior Publication Data

US 2019/0318304 A1 Oct. 17, 2019

Related U.S. Application Data

(63) Continuation of application No. 15/950,692, filed on Apr. 11, 2018, now Pat. No. 10,755,229.

(51) Int. Cl.
*G06Q 10/08* (2012.01)
*G06N 3/08* (2006.01)
(Continued)

(52) U.S. Cl.
CPC ............ *G06Q 10/087* (2013.01); *G06N 3/08* (2013.01); *G06K 9/4628* (2013.01); *G06Q 30/0631* (2013.01)

(58) Field of Classification Search
CPC . G06K 9/4628; G06Q 10/087; G06Q 30/0631
See application file for complete search history.

(56) References Cited

U.S. PATENT DOCUMENTS 5,749,081 A 5/1998 Whiteis
6,266,649 B1 7/2001 Linden et al.
(Continued)

FOREIGN PATENT DOCUMENTS

CN 104281890 A 1/2015
CN 110363213 A 10/2019
(Continued)

OTHER PUBLICATIONS

He et al., "Fashion Net: Personalized Outfit Recommendation with Deep Neural Network", arXiv:1810.02443v1, Oct. 4, 2018, 9 pages.
(Continued)

*Primary Examiner* — A. Hunter Wilder
(74) *Attorney, Agent, or Firm* — Reza Sarbakhsh

(57) ABSTRACT

A first plurality of f-scores for a first plurality of products in an inventory are determined. The first plurality of f-scores are discretized to generate a plurality of groups, and a forecast is generated for each of the groups based on historical data associated with the first plurality of products. Projected gaps in the inventory are identified based on the forecasts. A second plurality of f-scores are determined for a second plurality of products, where each of the second plurality of products is not in the inventory. For each of the second plurality of products, a corresponding group in the plurality of groups is identified based on the second plurality of f-scores, an at least one product in the second plurality of products is selected to order, based on determining that the identified corresponding group aligns with at least one of the one or more projected gaps in inventory.

8 Claims, 15 Drawing Sheets

(51) Int. Cl.
*G06Q 30/06* (2012.01)
*G06K 9/46* (2006.01)

(56) References Cited

U.S. PATENT DOCUMENTS

| | | |
|---|---|---|
| 7,007,074 B2 | 2/2006 | Radwin |
| 7,113,917 B2 | 9/2006 | Jacobi et al. |
| 7,617,016 B2 | 11/2009 | Wannier et al. |
| 7,921,061 B2 | 4/2011 | Rangarajan et al. |
| 7,979,877 B2 | 7/2011 | Huber et al. |
| 8,620,707 B1 | 12/2013 | Belyi et al. |
| 8,751,930 B2 | 6/2014 | Jhoney et al. |
| 8,908,962 B2 | 12/2014 | Bhardwaj et al. |
| 9,135,491 B2 | 9/2015 | Morandi et al. |
| 9,141,886 B2 | 9/2015 | Auclair et al. |
| 9,661,886 B1 | 5/2017 | Selvarajan |
| 9,785,898 B2 | 10/2017 | Hofman et al. |
| 10,062,039 B1 | 8/2018 | Lockett |
| 10,540,575 B1 | 1/2020 | Brody |
| 10,776,417 B1 | 9/2020 | Ravichandran |
| 2006/0277098 A1 | 12/2006 | Chung et al. |
| 2007/0150801 A1 | 6/2007 | Chidlovskii et al. |
| 2007/0244842 A1 | 10/2007 | Ishii et al. |
| 2008/0228749 A1 | 9/2008 | Brown |
| 2008/0262917 A1 | 10/2008 | Green et al. |
| 2008/0306819 A1 | 12/2008 | Berkhin et al. |
| 2008/0307052 A1 | 12/2008 | Krishnan et al. |
| 2009/0006156 A1 | 1/2009 | Hunt et al. |
| 2009/0276291 A1 | 11/2009 | Wannier et al. |
| 2011/0011936 A1 | 1/2011 | Morandi et al. |
| 2011/0103682 A1 | 5/2011 | Chidlovskii et al. |
| 2012/0123978 A1 | 5/2012 | Toderice et al. |
| 2012/0323620 A1 | 12/2012 | Hofman et al. |
| 2013/0066742 A1 | 3/2013 | Stevens et al. |
| 2014/0003729 A1 | 1/2014 | Auclair et al. |
| 2014/0039979 A1 | 2/2014 | Zhang et al. |
| 2014/0379426 A1 | 12/2014 | Guo et al. |
| 2015/0046223 A1 | 2/2015 | Sewak |
| 2015/0058079 A1 | 2/2015 | Freund et al. |
| 2015/0139485 A1 | 5/2015 | Bourdev |
| 2015/0254675 A1 | 9/2015 | Kannan et al. |
| 2015/0324828 A1 | 11/2015 | Ouimet |
| 2015/0332296 A1 | 11/2015 | Chu et al. |
| 2015/0339726 A1 | 11/2015 | Herring et al. |
| 2015/0347933 A1 | 12/2015 | Sewak |
| 2016/0085889 A1 | 3/2016 | Sewak |
| 2016/0110794 A1 | 4/2016 | Hsiao et al. |
| 2016/0125503 A1 | 5/2016 | Li et al. |
| 2016/0148150 A1 | 5/2016 | Curtat et al. |
| 2016/0189011 A1 | 6/2016 | Bhardwaj et al. |
| 2016/0189274 A1 | 6/2016 | MacLaurin et al. |
| 2016/0225053 A1 | 8/2016 | Romley et al. |
| 2016/0371261 A1 | 12/2016 | Cormack et al. |
| 2017/0004567 A1 | 1/2017 | Dutt et al. |
| 2017/0098187 A1 | 4/2017 | Jung et al. |
| 2017/0178061 A1 | 6/2017 | Griffin et al. |
| 2018/0005035 A1 | 1/2018 | Bogolea et al. |
| 2018/0005106 A1 | 1/2018 | Hachiya |
| 2018/0114114 A1 | 4/2018 | Molchanov et al. |
| 2018/0189725 A1 | 7/2018 | Mattingly et al. |
| 2018/0218436 A1 | 8/2018 | Cooper |
| 2018/0349477 A1 | 12/2018 | Jaech et al. |
| 2019/0026609 A1 | 1/2019 | Shen |
| 2019/0043003 A1 | 2/2019 | Fisher et al. |
| 2019/0220694 A1 | 7/2019 | Biswas et al. |
| 2019/0251446 A1 | 8/2019 | Fang et al. |
| 2019/0278426 A1 | 9/2019 | He et al. |
| 2019/0318209 A1 | 10/2019 | Sewak et al. |
| 2019/0318210 A1 | 10/2019 | Sewak et al. |
| 2019/0318299 A1 | 10/2019 | Sewak |
| 2019/0355008 A1 | 11/2019 | Sewak |
| 2019/0355041 A1 | 11/2019 | Sewak et al. |
| 2019/0370874 A1 | 12/2019 | Brooks et al. |
| 2020/0005087 A1 | 1/2020 | Sewak |
| 2020/0034781 A1 | 1/2020 | Sewak et al. |

FOREIGN PATENT DOCUMENTS

| | | |
|---|---|---|
| CN | 110728015 A | 1/2020 |
| JP | 2004508604 A | 3/2004 |
| WO | 2010141637 A1 | 12/2010 |
| WO | 2015127394 A1 | 8/2015 |
| WO | 2016098973 A1 | 6/2016 |

OTHER PUBLICATIONS

Huang et al., "Outfit Recommendation System Based on Deep Learning", Advances in Computer Science Research, vol. 74, 2nd International Conference on Computer Engineering, Information Science & Technology (ICCIA 2017), pp. 170-174.

Jaradat, "Deep Cross-Domain Fashion Recommendation", Proceedings of the Eleventh ACM Conference on Recommender Systems, Aug. 27-31, 2017, pp. 407-410.

Li et al., "Mining Fashion Outfit Composition Using an End-to-End Deep Learning Approach on Set Data", IEEE Transactions on Multimedia 19.8 (2017), pp. 1946-1955.

Liu et al., "Deepfashion: Powering Robust Clothes Recognition and Retrieval with Rich Annotations", Proceedings of the IEEE Conference on Computer Vision and Pattern Recognition, 2016, pp. 1096-1104.

Nguyen et al., "Learning to Rank for Personalised Fashion Recommender Systems Via Implicit Feedback", Mining Intelligence and Knowledge Exploration, Springer, 2014, pp. 51-61.

Shah et al., "Fashion Outfit Composition by Deep Learning Approach", International Research Journal of Engineering and Technology (IRJET), vol. 05 Issue: 06, Jun. 2018, pp. 1549-1555.

Tuinhof et al., "Image Based Fashion Product Recommendation with Deep Learning", International Conference on Machine Learning, Optimization, and Data Science, Jul. 17, 2018, pp. 1-10.

Sewak et al., "Practical Convolutional Neural Networks", Implement Advanced Deep Learning Models Using Python, Chapter 2, Feb. 2018, pp. 26-40.

Sewak et al., "Practical Convolutional Neural Networks", Implement Advanced Deep Learning Models Using Python, Chapter 4, Feb. 2018, pp. 92-102.

Sewak et al., "Practical Convolutional Neural Networks", Implement Advanced Deep Learning Models Using Python, Chapter 5, Feb. 2018, pp. 104-113.

Phillips et al., "Narrative and Persuasion in Fashion Advertising", Journal of Consumer Research, vol. 37, Issue 3, Oct. 1, 2010, pp. 368-392, Abstract provided.

Davis et al., "Apparel Advertising Appeals as a Function of Apparel Classification: Trendy Versus Classic," Perceptual and Motor Skills, 1989, 68, pp. 1011-1014.

Lennon et al., "Evaluations of Apparel Advertising as a Function of Self-Monitoring", Preceptual and Motor Skills, 1988, 66, pp. 987-996.

Ingram, "Ideas for Advertising Clothes", Chron.com, http://smallbusiness.chron.com/ideas-advertising-clothes-10375.html, downloaded May 1, 2018, pp. 1-5.

LeChat, "Promotional Strategies for a Clothing Store", Chron.com, http://smallbusiness.chron.com/promotional-strategies-clothing-store-13851.html, downloaded May 1, 2018, pp. 1-4.

West, "Fashion Marketing Techniques", Chron.com, http:/smallbusiness.chron.com/fashion-marketingtechniques-65320.html, downloaded May 1, 2018, pp. 1-4.

Reynolds, "Creative Marketing Strategies for the Fashion Industry", Chron.com, http:/smallbusiness.chron.com/creative-marketing-strategies-fashion-industry-67393.html, downloaded May 1, 2018, pp. 1-5.

Masaki, "How to Advertise and Market Your Clothing Line", Clothing Line—Advertising and Marketing Tips and Tricks by HTSACC, https://www.howtostartacloghingcompany.com/advertise-market-clothing-line/ downloaded May 1, 2018, pp. 1-13.

Author Unknown, "20 Product Priorization Techniques: A Map and Guided Tour", Folding Burritos (https://foldingburritos.com/product-prioritization-techniques/, downloaded May 1, 2018, pp. 1-30.

(56) References Cited

OTHER PUBLICATIONS

U.S. Appl. No. 15/950,738 "Cognitive Analysis and Classification of Apparel Images," filed Apr. 11, 2018.
U.S. Appl. No. 15/950,692 "Cognitive Fashion-Ability Score Driven Fashion Merchandising Acquisition," filed Apr. 11, 2018.
U.S. Appl. No. 16/449,601, "Cognitive Analysis and Classification of Apparel Images," filed Jun. 24, 2019.
IBM, "List of IBM Patents or Patent Applications Treated as Related," for U.S. Appl. No. 16/438,822, filed Jun. 12, 2019.
Witcher et al., "The Forester Wave™: Omnichannel Order Management, Q3 2016", The Nine OMS Providers That Matter Most for Omnichannel Retail and How They Stack Up, For Ebusiness & Channel Strategy Professionals., Forrester.com, Jul. 12, 2016, 20 pages.
Walker, "Inventory Management With Machine Learning—3 Use Cases in Industry", Techemergence, https://www.techemergence.com, Feb. 20, 2018, 10 pages.
Knight, "Inside Amazon's Warehouse, Human-Robot Symbiosis," Intelligent Machines, Jul. 7, 2015, pp. 1-8.
Canitz, "Machine Learning in Supply Chain Planning," Logility Planning Optimized, Oct. 4, 2016, pp. 1-2.
Author Unknown, "Coca-Cola Leverages AI for Inventory Management," Technology News, Supply Chain 24/7 Article, Mar. 28, 2017, pp. 1-11.
Pending U.S. Appl. No. 16/132,867, filed Sep. 17, 2018, entitled: "System and Method for Cognitive and Preemptive Fashion Inventory Management & Order Fulfilment", 53 pages.
Conlon,"The Vogue Glossary", http://www.vogue.eo.uk/gallery/the-vogue-glossary, Oct. 17, 2013, 63 pages.
Alves, "Predicting Product Sales in Fashion Retailing: A Data Analytics Approach", Jul. 23, 2017, 59 pages.
Spolini, "Cognitive Computing supports fashion designer", http://www.vogue.it/en/vogue-talents/news/2017/03/29/watson-ibm-jason-grech-marchesa-the-north-face/, Mar. 29, 2017, 4 pages.
McClellan, "Cognitive Marchesa dress lights up the night", https://www.ibm.com/blogs/internet-0f-things/cognitivemarchesa-dress/, Oct. 27, 2016, 3 pages.
Rubin, "Weaving Cognitive into Couture: Watson and Marchesa Collaborate for the Met Gala", https://www.ibm.com/blogs/think/2016/04/watson-and-marchesa/, Apr. 29, 2016, 4 pages.
Mastroianni, "Marchesa, IBM Watson design "cognitive dress" for Met Gala", http://www.cbsnews.com/news/marchesa-ibm-watson-to-debut-cognitive-dress-at-mondays-met-gala/, May 2, 2016, 4 pages.
Fashion Dictionary, http://wwd.com/fashion-dictionary/, Accessed Jun. 25, 2018, 22 pages.
Ralph et al., "A Framework for Automatic Online Personalization", Proceedings of the 39th Hawaii International Conference on System Sciences—2006, Downloaded on Nov. 6, 2020, 10 pages.

US 10,891,585 B2

COGNITIVE FASHION-ABILITY SCORE DRIVEN FASHION MERCHANDISING ACQUISITION

CROSS-REFERENCE TO RELATED APPLICATIONS

This application is a continuation of co-pending U.S. patent application Ser. No. 15/950,692, filed on Apr. 11, 2018. The aforementioned related patent application is herein incorporated by reference in its entirety.

BACKGROUND

The present disclosure relates to cognitive computing, and more specifically, to data-driven acquisitions of merchandise based on cognitive models.

Much of the recent progress in commerce (particularly commerce on the Internet) is often attributed to the backed analytics enabled by the platform, which helps to understand market demand and allows managers to fine-tune their offerings to better suit customer needs and desires. One of the fastest growing segments of commerce today involve fashion apparel, including accessories, footwear, clothing, jewelry, and the like. Apparel item sales are a highly personalized category of commerce, and typically involve very low conversion rates along with high return rates. Vendors are simply unable to customize their offerings to each individual customer due to the low conversion rates and highly personalized nature of the purchase. Systems and methods to cognitively analyze and classify apparel items in a quantitative manner are needed. Further, improved methods to acquire merchandise for retail based on cognitive analysis are desired.

SUMMARY

According to a one embodiment of the present disclosure, a method is disclosed. The method includes determining a first plurality of f-scores for a first plurality of products based on processing a first plurality of images using one or more convolutional neural networks (CNNs), wherein each of the first plurality of images corresponds to one of the first plurality of products, and wherein each of the first plurality of products is in an inventory. The method further involves discretizing the first plurality of f-scores to generate a plurality of groups, and generating, for each of the plurality of groups, a forecast based on historical data associated with each of the first plurality of products in each respective group. Additionally, the method includes identifying one or more projected gaps in the inventory, based on the generated forecasts. A second plurality of f-scores are determined for a second plurality of products based on processing a second plurality of images with the one or more CNNs, wherein each of the second plurality of products is not in the inventory. The method also includes identifying, for each of the second plurality of products, a corresponding group in the plurality of groups based at least in part on the second plurality of f-scores, and selecting at least one product in the second plurality of products to order, based at least in part on determining that the identified corresponding group aligns with at least one of the one or more projected gaps in inventory.

DETAILED DESCRIPTION

Embodiments of the present disclosure introduce f-scores, which are quantitative and objective descriptions of apparel items. By analyzing images of apparel items using unique convolutional neural networks (CNNs), an f-score can be generated for each apparel item depicted in the image. In various embodiments, these f-scores can then be used to enable a variety of use-cases that were previously not possible. As used herein, an apparel item may include any fashion item, including jewelry, clothing, footwear, accessories, headwear, and the like. In many embodiments, the attributes of an apparel item that affect how humans perceive it can be exceedingly subtle, and include subconscious aspects that individuals do not even realize they are considering. Similarly, in many implementations, the concepts that determine how to analyze and classify an apparel item can vary significantly across categories and subcategories of apparel.

To address this disparity, in one embodiment, a set of one or more CNNs are trained for each category or subcategory of apparel. For example, in such an embodiment, a first set of convolutional neural networks may be trained to process shoes, while a different set of CNNs is utilized to process dresses. Similarly, in some embodiments, the categories are defined more narrowly in order to better align and classify the items. For example, in one embodiment, there may be a first set of CNNs configured to generate f-scores for dress shoes, while a different set of neural networks processes athletic shoes. In one embodiment, the resolution used, or the granularity/specificity of the categories, can be determined based on the particular implementation. For example, a retailer specializing in footwear may require more specialized models for each specific category, while a broader retailer that only sells a few shoes may not require such specificity.

Figure 1:
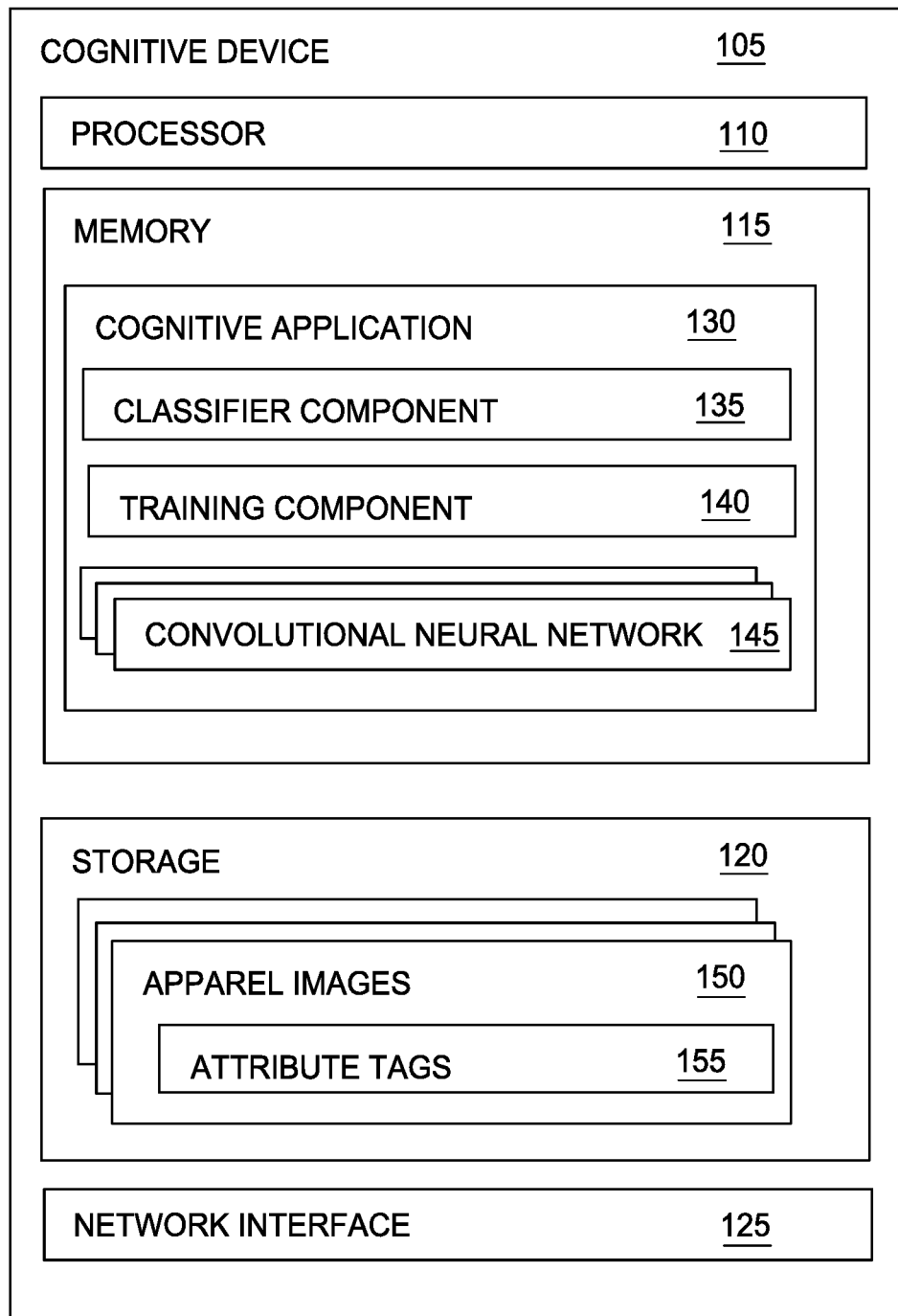
FIG. 1 is a block diagram of a cognitive device, according to one embodiment disclosed herein.

FIG. 1 is a block diagram of a Cognitive Device 105, according to one embodiment disclosed herein. As illustrated, the Cognitive Device 105 includes a Processor 110, a Memory 115, Storage 120, and a Network Interface 125. In the illustrated embodiment, Processor 110 retrieves and executes programming instructions stored in Memory 115 as well as stores and retrieves application data residing in Storage 120. Processor 110 is representative of a single CPU, multiple CPUs, a single CPU having multiple processing cores, and the like. Memory 115 is generally included to be representative of a random access memory. Storage 120 may be a disk drive or flash-based storage device, and may include fixed and/or removable storage devices, such as fixed disk drives, removable memory cards, or optical storage, network attached storage (NAS), or storage area-network (SAN). In the illustrated embodiment, the Cognitive Device 105 may be communicatively coupled with other devices through the Network Interface 125.

In the illustrated embodiment, the Memory 115 includes a Cognitive Application 130. The Cognitive Application 130 includes a Classifier Component 135, a Training Component 140, and a plurality of Convolutional Neural Networks 145. The Classifier Component 135 is generally configured to receive images of apparel items and determine which category of apparel item is depicted. In some embodiments, the Classifier Component 135 may include one or more machine learning models. In some embodiments, the Classifier Component 135 utilizes a deep learning or question and answer system, such as IBM's Watson. In one embodiment, the Classifier Component 135 is trained based on the system in which it will be utilized. That is, in one embodiment, the Classifier Component 135 is trained based on the specific categories that are to be used in the particular implementation.

In one embodiment, the Classifier Component 135 is trained using labeled training data, such as Apparel Images 150. In the illustrated embodiment, each Apparel Image 150 stored in Storage 120 includes associated metadata describing the image, and/or describing apparel item depicted therein. For example, as illustrated, each Apparel Image 150 includes one or more Attribute Tags 155. In one embodiment, one such Attribute Tag 155 indicates which category the depicted apparel item belongs to. In this way, the tagged Apparel Images 150 can be used to train one or more cognitive models in the Classifier Component 135. For example, in one embodiment, each Apparel Image 150 is provided to a machine learning model as input, and the tagged category is provided as target output. After being trained, the Classifier Component 135 can then receive untagged Apparel Images 150 and determine which category or categories the depicted apparel item(s) belong to.

In some embodiments, the Apparel Images 150 used to train the Classifier Component 135 may be manually tagged or sorted by users based on the depicted apparel category. In some embodiments, one or more web crawlers can be utilized to automatically retrieve and tag the images for use. In one embodiment, web searches (e.g., on the Internet) can be initiated based on strings corresponding to each desired category, and the resulting images can be retrieved for training the Classifier Component 135. For example, in such an embodiment, training images for formal dresses may be retrieved by conducting one or more web searches for "formal dress," "evening gown," and other similar text strings that describe apparel items within the desired category. The retrieved images may then be automatically tagged with the appropriate category, which facilitates training of the Classifier Component 135. In some embodiments, the Classifier Component 135 also generates a confidence measure indicating how reliable the classification is. In some embodiments, if the generated confidence measure is below a predefined threshold, the image may be rejected, or flagged for verification by a user.

In the illustrated embodiment, the Cognitive Application 130 also includes a Training Component 140 which is used to generate and train the Convolutional Neural Networks 145. As discussed above, in some embodiments, there are one or more Convolutional Neural Networks 145 corresponding to each identified category of apparel. As will be discussed in more detail below, each Convolutional Neural Network 145 may be trained utilizing Apparel Images 150 and their corresponding Attribute Tags 155, such that the Convolutional Neural Networks 145 can process new untagged Apparel Images 150 and quantify the various attributes of the depicted apparel item. In various embodiments, the Attribute Tags 155 may include information regarding any number of attributes. For example, in various embodiments, such attributes may include the contemporariness of the apparel item (e.g., as determined based on the year the apparel item was released/announced or the year the associated image was published/featured), the designer of the apparel item, the brand of the apparel item, the publication that featured the apparel item (i.e., the magazine, website, television channel, etc. that published the corresponding image), and the like. Similarly, in some embodiments, additional attributes may include what the object is (e.g., a shirt, pants, shoes, etc.), the material the item is made of, a pattern of the material, a name of the item, an age-group associated with the item, a gender the item is designed for, price of the item, and the like. In some embodiments, the attributes may further include indications of the popularity of the item, such as survey responses, social media reactions, and the like.

In order to facilitate the training of the Convolutional Neural Networks 145, the Apparel Images 150 may be tagged in a number of ways. For example, in one embodiment, users review each Apparel Image 150 to identify each attribute and tag it. In some embodiments, the Apparel Images 150 are retrieved by one or more web crawlers that conduct Internet searches using predetermined strings corresponding to the desired attributes. For example, to retrieve and tag apparel images used to train a Convolutional Neural Network 145 based on the designer of an evening gown, one or more web searches may be conducted using a strings such as "DesignerA evening gown," "DesignerB evening gown," "evening gown+DesignerC," and the like. The retrieved images can then be automatically tagged based on the search terms utilized to retrieve them. Similarly, in order to train a Convolutional Neural Network 145 based on the contemporariness of jewelry, web searches may be initiated with specific time constraints (e.g., per year, per three-year period, and the like).

Figure 2:
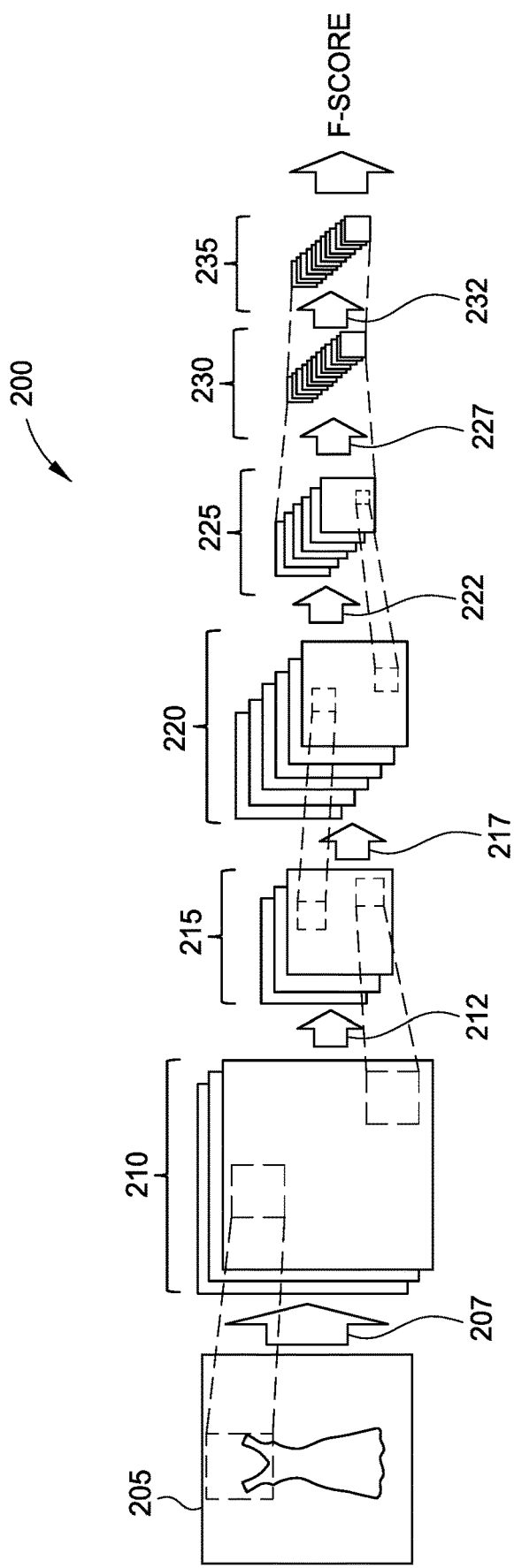
FIG. 2 illustrates a convolutional neural network configured to analyze and classify apparel items, according to one embodiment disclosed herein.

FIG. 2 illustrates a CNN 200 configured to analyze and classify apparel items, according to one embodiment disclosed herein. In the illustrated embodiment, the CNN 200 receives an Image 205 of an apparel item (the depicted Image 205 is a women's dress), and outputs an F-Score. In some embodiments, the F-Score is a single value (e.g., between 0 and 1) quantifying the apparel item. In some embodiments, the generated F-Score is an N-dimensional vector, where N is the number of attributes used in the particular implementation. In one embodiments, the F-Score does not indicate how "fashionable" the apparel item is (such that an f-score of 0.7 is "more fashionable" than an f-score of 0.2), but rather is a quantitative value that can be used to compare apparel items to determine their objective similarity based on fashion attributes. That is, a dress with an F-Score of 0.4 may not be less fashionable than a dress with an f-score of 0.7, but all dresses with F-Scores of about 0.4 may be grouped together as satisfying similar fashion preferences.

In some embodiments, each CNN 200 is configured to analyze images based on a particular attribute, and the generated results (e.g., results vectors) are aggregated to generate the f-score. In other embodiments, a single CNN 200 may be configured to analyze images according to all of the attributes, and generate a multi-dimensional vector as the f-score, where each dimension corresponds to a particular attribute. As discussed above, in some embodiments, each category of apparel item may correspond to a set of one or more convolutional neural networks, and a CNN 200 trained to process a first category is not also used to process a second category of apparel.

In the illustrated embodiment, processing the input Image 205 with the CNN 200 involves a number of processing steps spread across a number of layers of neurons. For example, in one embodiment, processing the image may include one or more of convolution steps, non-linearity steps, pooling or sub-sampling steps, and classification steps. In the illustrated embodiment, the first operation (illustrated by arrow 207) is a convolution step. A convolution step typically involves processing the input region with one or more filters or feature detectors. For example, the convolution step may involve sliding a filter or feature detector (e.g., a predefined matrix of values) across the Image 205 (i.e., across a matrix of values corresponding to the pixel values at each pixel) and utilizing element-wise multiplication or dot products to generate a convolved feature, feature map, or activation map based on the corresponding pixel data. In the illustrated embodiment, three feature detectors are used, such that the generated Feature Map 210 has a depth of three. Of course, in various embodiments, any number of filters may be utilized.

In some embodiments, non-linearity is also introduced by replacing all negative values in the Feature Map 210 with a zero. In some embodiments, this operation is performed alongside the convolution step 207. As illustrated, the next processing step involves pooling 212 to create more manageable Feature Maps 215. For example, in the illustrated embodiment, pooling involves reducing the size of the Feature Maps 210 (e.g., reducing the size of the corresponding matrices) by using the maximum value in each region as the value in the pooled Feature Map 215. In the illustrated embodiment, the Convolutional Neural Network 200 includes an additional set of convolution, non-linearity, and pooling operations (e.g., as indicated by arrows 217 and 222). In various embodiments, any number of convolution operations may be utilized in the particular CNN 200, depending on the particular implementation.

As illustrated by arrow 227, after the convolution steps have been completed, the data is passed to one or more Classifier Layers 230 and 235. In one embodiment, these Classifier Layers 230 and 235 are fully connected, indicating that every neuron in the previous layer is connected to every neuron in the subsequent layer. For example, in one embodiment, the output data from the last step in the "middle" or "hidden" layers of the CNN 200 represent high-level features of the input image, and the Classifier Layers 230 and 235 utilize these detected features to classify the image based on the defined attribute(s) used to train the CNN 200. In one embodiment, the one or more Classifier Layers 230 and 235 include a softmax activation function. The result of this processing is an F-Score that quantifies the apparel item in the Image 205 according to the defined attributes. This F-Score can then be utilized to compare items, and determine apparel items that the selected item is objectively similar to (based on the attributes).

Figure 3A:
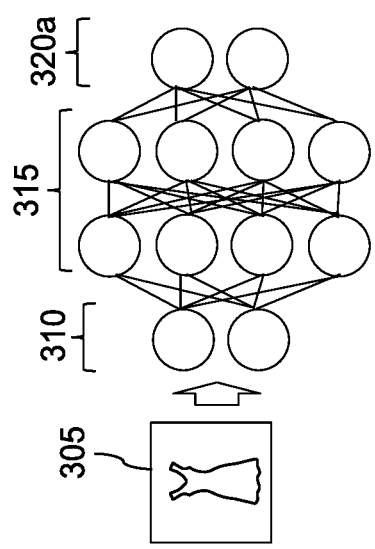
FIGS. 3a to 3f illustrate a method for training convolutional neural networks to classify and analyze apparel items, according to one embodiment disclosed herein.

FIGS. 3a to 3f illustrate a method for training convolutional neural networks to classify and analyze apparel items, according to one embodiment disclosed herein. In the illustrated embodiment, transfer learning is utilized to train the convolutional neural network on each attribute. Notably, although the illustrated embodiment depicts each layer as fully connected, in implementation, one or more layers may not be fully connected. In some embodiments, only the classifier layer(s) is fully connected. In FIG. 3a, an input Image 305 is provided to an Input Layer 310 of the convolutional neural network. Although the depicted CNN has two input neurons, there may of course be any number of neurons in various embodiments. The data is then passed to one or more Middle Layers 315 (sometimes referred to as "hidden" layers), where it is processed as described above. Although two middle layers are illustrated, there may of course be any number of middle layers in various embodiments. Similarly, although each middle layer is depicted as including four neurons, there may of course be any number in actual implementation.

Figure 3B:
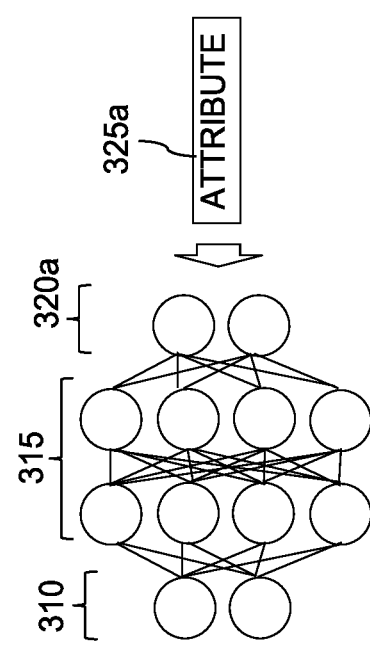

In the illustrated embodiment of FIG. 3a, a Classifier Layer 320a includes two neurons. As discussed above, in various embodiments there may be multiple Classifier Layers 320a, each with any number of neurons. When the Image 305 is provided to the CNN, some output is produced by the Classifier Layer 320a. Before the CNN is trained, this output is arbitrary and not useful. As illustrated in FIG. 3b, a first Attribute 325a is provided to the CNN as the target output for the Image 305, and is propagated backwards through the CNN. As this data propagates backwards towards the Input Layer 310, the weights associated with each neuron are updated to train the CNN. In an embodiment, this process (illustrated in FIGS. 3a and 3b) is repeated for each training Image 305 available (and the corresponding Attribute 325a). After processing each training Image 305, the CNN is fully trained and ready to receive new (untagged) images and process them to generate a value or vector reflecting the Attribute 325a. In one embodiment, based on this resulting vector, the apparel item depicted in the input image can be compared with other apparel items which have also been processed by the CNN. For example, if the resulting vector is 0.4, the apparel item is similar (with regards to the Attribute 325a) to other apparel items which also scored 0.4.

Although not illustrated, in some embodiments, the Attribute 325a and/or Image 305 may be vectorized or processed in some other way prior to processing with the CNN. In some embodiments, the training Images 305 may be cropped to include different areas or regions depicting particular aspects of the apparel. For example, in one embodiment a single image may be used to create several training images by cropping to different areas (e.g., the sleeve of a shirt, the neckline, and the like). In some embodiments, the images are also pre-processed to harmonize their size and/or scale. In one embodiment, the system extracts the intensity of the training images across all color channels available. In some embodiments, the corresponding Attributes 325a may be stored in a distinct repository, or as metadata associated with the corresponding image.

Figure 3C:
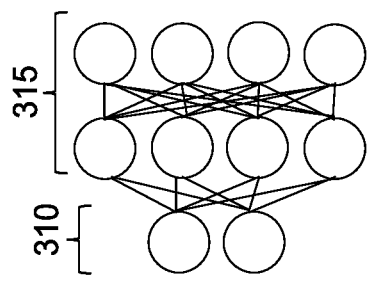
Figure 3D:
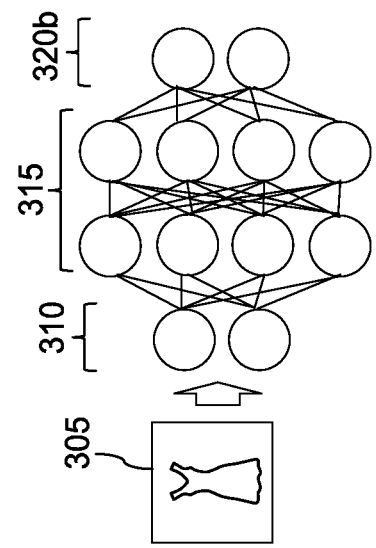

In one embodiment, the generated f-score is dependent on only a single attribute. In such an embodiment, once the CNN has been trained based on the Attribute 325a, new images can be assigned f-scores based on their similarity relative to this Attribute 325a. In other embodiments, however, multiple attributes are used to score and classify apparel items, in order to provide a broader understanding. In one embodiment, a new CNN is trained for each attribute. In some embodiments, transfer learning is utilized. For example, in one embodiment, once the CNN has been trained based on the first Attribute 325a, the final Classifier Layer(s) 320a are removed from the CNN, as illustrated in FIG. 3c. As discussed above, in an embodiment, the resulting output from the last Middle Layer 315 represents high-level features of the input image, but does not classify the input image or score the image based on the Attribute 325a. As illustrated in FIG. 3d, in one embodiment, a new Classifier Layer 320b (e.g., one or more classifier layers with any number of neurons) are generated and added to the existing CNN layers 310 and 315. Because of the above training, these layers 310 and 315 are already configured to recognize features in apparel items, but cannot classify these features or generate an f-score. In some embodiments, this transfer is accomplished by extracting the weight matrix from the middle layer(s), and creating a new CNN using those weights. A new classifier layer(s) can then be trained for the new attribute.

Figure 3E:
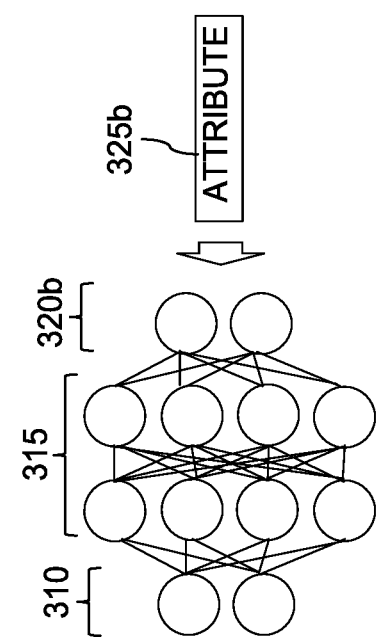

As illustrated in FIG. 3e, a new Attribute 325b is then provided as the target output for the Image 305, in order to train the new Classifier Layer 320b. In some embodiments, retraining the CNN in this way constitutes propagating the data back through the CNN towards the Input Layer 310, and updating or refining the weights associated with each neuron along the way. In such an embodiment, some or all of the Middle Layers 315 of the CNN can also be retrained or refined based on the second Attribute 325b. In some embodiments, only the Classifier Layer 320b is trained, and the weights associated with the Middle Layers 315 are frozen. In some embodiments, one or more of the Middle Layers 315 may have their weights refined, while one or more other Middle Layers 315 are frozen and unchanged.

Figure 3F:
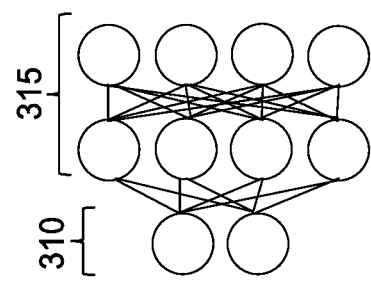

After this second training has been completed for all of the available tagged training images, the CNN is capable of processing new images to score them according to the second Attribute 325b. In some embodiments, as illustrated in FIG. 3f, this new classifier layer is then stripped, so that the CNN can be trained based on yet another attribute. In some embodiments, this pruning and retraining process is iterated for each attribute that is to be used. Once all attributes have been trained, the Cognitive Application 130 may generate one or more convolutional neural networks based on this training. In some embodiments, the pruned classifier layers are also utilized. That is, in an embodiment, the Cognitive Application 130 stores each of the classifier layers for each corresponding attribute (and may also store the entire CNN). When all attributes have been trained, these stored layer(s) can be used to process new images as they are received.

For example, in one embodiment, the fully trained CNN is replicated a number of times, such that there is one CNN for each attribute. At this point, in one embodiment, each classifier layer that was removed is then added back onto one of the fully trained CNNs, so as to create N fully configured CNNs, one for each of N attributes. In some embodiments, the weight matrix was extracted from the middle layer(s) to train the other CNNs, and the trained CNN is simply stored with a reference to the corresponding attribute it was trained for. These trained CNNs can then be retrieved as part of the process of generating the final CNNs. In some embodiments, a new classifier layer is trained for each attribute, to create N CNNs (one for each of N attributes). In some embodiments, a single CNN is used, and one or more classifier layers are trained to score and classify the input image across all N attributes. Additionally, rather than utilizing transfer learning as discussed above, in some embodiments a single CNN is trained based on all of the attributes at once. For example, in one embodiment, for each apparel image used as training input, the associated f-score is used as target output. In embodiments, this f-score may be an N-dimensional vector corresponding to N attributes.

In one embodiment, each CNN may be associated with a tag (e.g., in metadata) indicating whether the training was successful, as well as the date at which it was last trained. For example, in one embodiment, a set of validation images can be processed by the trained CNN, and the output can be analyzed to determine whether the CNN produces satisfactory results. If the results are not satisfactory, in one embodiment, the CNN is not used for classifying new images. In some embodiments, additional training images are retrieved to continue training the model.

Figure 4:
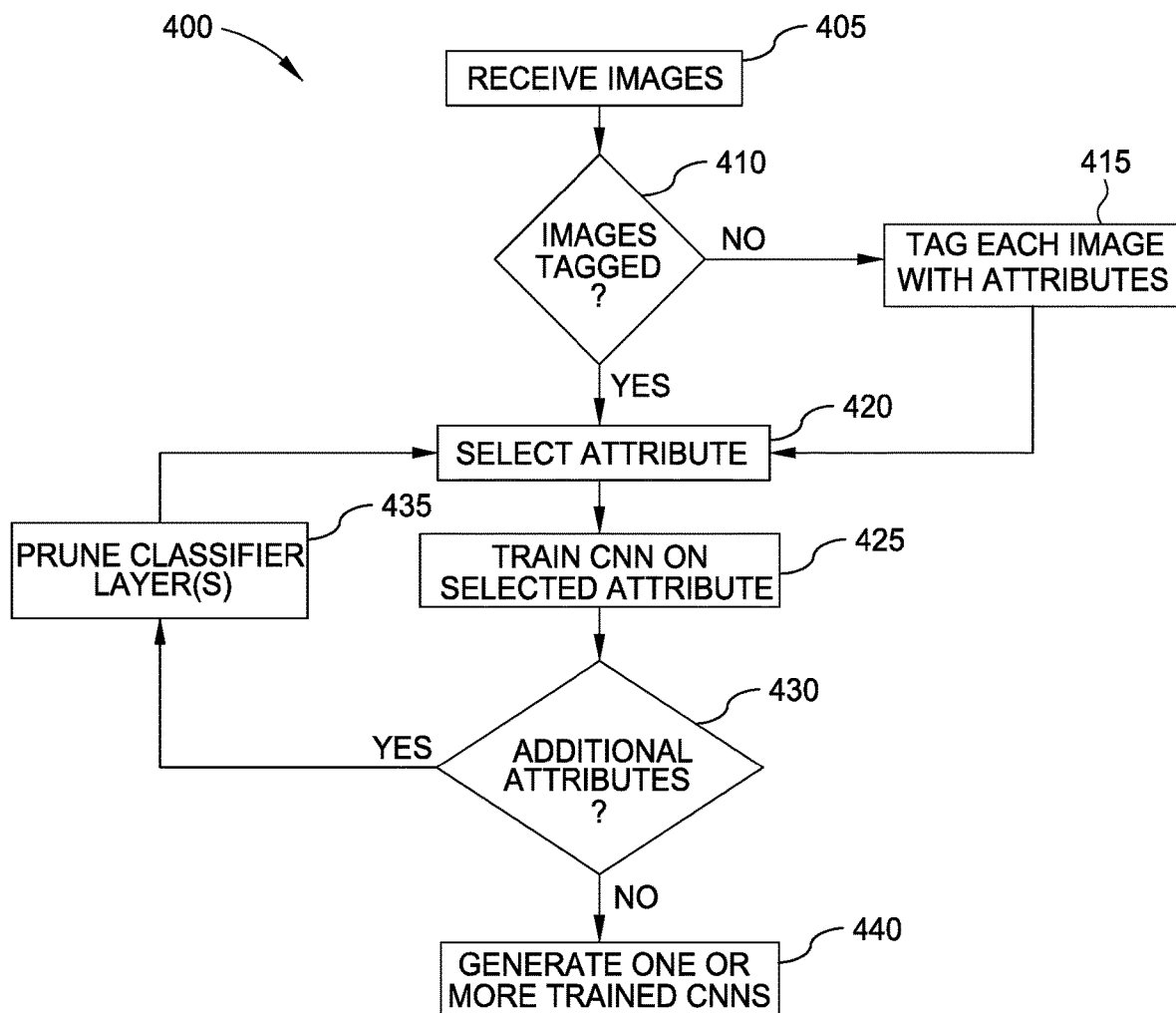
FIG. 4 is a flow diagram illustrating a method of training convolutional neural networks to classify and analyze apparel items, according to one embodiment disclosed herein.

FIG. 4 is a flow diagram illustrating a method 400 of training convolutional neural networks to classify and analyze apparel items, according to one embodiment disclosed herein. In the illustrated embodiment, the method 400 begins at block 405, where the Cognitive Application 130 receives training images. As discussed above, each of these training images may depict an apparel item of a particular category (although, depending on the method used to retrieve the images, some portion of the images may include other unwanted content as well). At block 410, the Cognitive Application 130 determines whether the images are tagged. That is, in the illustrated embodiment, the Cognitive Application 130 determines whether the training images have corresponding attribute tags. If not, the method 400 proceeds to block 415, where the images are tagged. In various embodiments, this may include automatically tagging the images based on the methodology used to retrieve them (e.g., based on the search terms used to find the image), or may be completed manually.

Once all images are tagged with their attributes, the method 400 proceeds to block 420, where the Cognitive Application 130 selects a first attribute of the desired attributes. In some embodiments, the particular attributes used may depend on the category of apparel, the environment in which the system will be used, and the like. The method 400 then proceeds to block 425, where the Cognitive Application 130 trains a convolutional neural network based on the selected attribute. At block 430, it is determined whether additional attributes remain to be trained. If so, the method 400 continues to block 435, where the weight matrix of the middle layer(s) is extracted, as discussed above. In some embodiments, this is referred to as pruning the classifier layers, as discussed above. The method 400 then proceeds to block 420 to select the next attribute. In this way, transfer learning is utilized to train the CNN based on each of the attributes.

Once all attributes have been trained, the method 400 proceeds to block 440, where the Cognitive Application 130 generates one or more trained CNNs. For example, as discussed above, in one embodiment, the trained CNN is replicated for each attribute, and a new classifier layer is generated and trained for each attribute. In one embodiment, the previously trained classifier layers are retained, and generating the one or more trained CNNs may be accomplished by referencing these stored CNNs. In some embodiments, generating one or more trained CNNs constitutes training a single classifier layer to score and classify each attribute, and using a single CNN. When the method 400 terminates, one or more CNNs have been fully trained to process images of apparel items of the respective category. In embodiments, this method 400 is repeated for each category that requires training. For example, the method 400 may be completed for a formal dress category, again for an evening gown category, again for a sundress category, and the like. In such an embodiment, each category is thereby associated with a respective set of one or more CNNs that have been trained explicitly for that category.

In some embodiments, the Cognitive Application 130 may continue to refine and update the one or more CNNs as needed. For example, in one embodiment, the Cognitive Application 130 refines the CNNs with new data (e.g., images) periodically (e.g., every day, every month, etc.). In some embodiments, the Cognitive Application 130 refines the CNNs upon user request. In one embodiment, the Cognitive Application 130 can monitor public events (e.g., fashion shows, television events, movies, gatherings, and the like) to determine whether something influencing fashion has occurred. For example, after a new movie is released, the apparel featured in the movie may see a spike in demand afterward. In one embodiment, the Cognitive Application 130 may refine the CNNs based on these events. For example, the Cognitive Application 130 may process images associated with the event to determine the appropriate category, and refine the corresponding CNNs to reflect any new trends.

Figure 5:
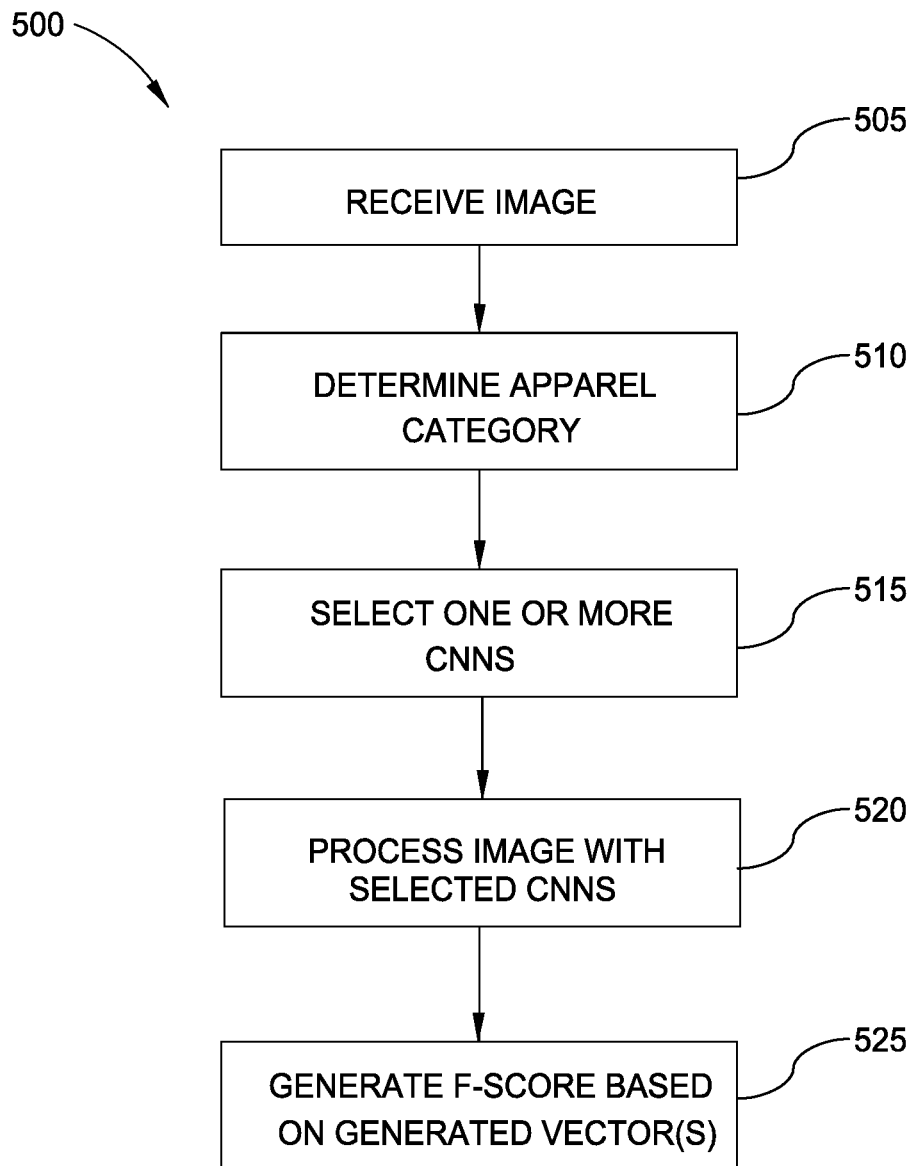
FIG. 5 is a flow diagram illustrating a method of analyzing and classifying apparel items based on images, according to one embodiment disclosed herein.

FIG. 5 is a flow diagram illustrating a method 500 of analyzing and classifying apparel items based on images, according to one embodiment disclosed herein. The illustrated method 500 occurs after the various machine learning models and/or convolutional neural networks have been trained, as discussed above. At block 505, the Cognitive Application 130 receives an image to be processed. For example, this image may include an apparel item, and lack any tags or associated attributes. At block 510, the Cognitive Application 130 determines the appropriate category for the apparel item depicted in the image. For example, as discussed above, in one embodiment, the Classifier Component 135 may process the received image with one or more machine learning models (e.g., a deep question and answer model, a neural network, and the like) to determine which category the apparel belongs to. Similarly, as discussed above, in some embodiments, the particular user of the Cognitive Application 130 determines the categories to be used, and how broad each category is. In some embodiments, if the Classifier Component 135 also generates a confidence measure that is below a predefined threshold, the method 500 terminates or pauses in order for a user to review the image and verify the category.

Once the appropriate category has been identified, the method 500 proceeds to block 515, where the Cognitive Application 130 selects one or more CNNs based on the identified category. That is, in one embodiment, each category is associated with a set of one or more convolutional neural networks that have been trained based on data corresponding to that respective category. In such an embodiment, the Cognitive Application 130 selects the appropriate set of CNNs based on the identified category in the received image. At block 520, the Cognitive Application 130 processes the received image using this selected set of one or more CNNs. As discussed above, this may result in one or more vectors or values, depending on the number of attributes used, how many CNNs are used, and the particular implementation of the embodiments disclosed herein. The method 500 then proceeds to block 525, where the Cognitive Application 130 generates an f-score for the depicted apparel item based on the generated vector(s) from the convolutional neural networks. For example, if a single CNN is used, the generated f-score may simply be the output from that CNN. If multiple CNNs are utilized, generating the f-score may comprise aggregating the generated outputs. For example, in one embodiment, the generated f-score is an N-dimensional vector, with each of the N dimensions corresponding to an attribute, and the value of the dimension being determined based on the output from one of the N CNNs used.

In some embodiments, the f-score is a simplified version of the N-dimensional vector. For example, in some embodiments, a user may specify which attribute(s) they wish to utilize, and the f-score may correspond to that particular dimension in the N-dimensional vector. In one embodiment, if multiple attributes are to be considered, the corresponding values may be aggregated (e.g., by averaging the data, finding the median, finding the mode, etc.) to generate the f-score. In some embodiments, the generated f-score and/or the N-dimensional vector may be stored associated with the image or apparel item record, such as in metadata or in a separate repository with a reference to the image/item.

Figure 6:
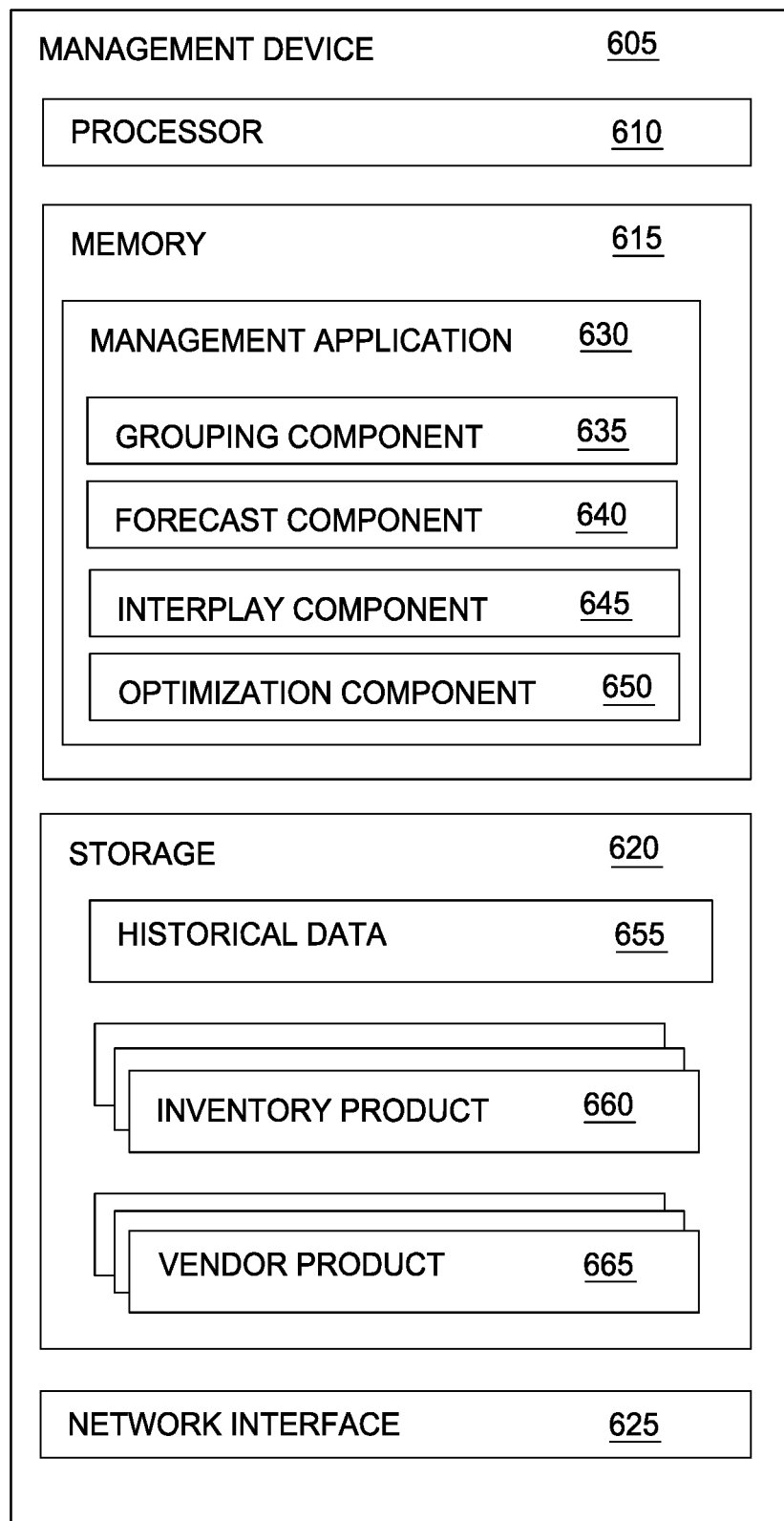
FIG. 6 is a block diagram of a management device, according to one embodiment disclosed herein.

FIG. 6 is a block diagram of a Management Device 605, according to one embodiment disclosed herein. As illustrated, the Management Device 605 includes a Processor 610, a Memory 615, Storage 620, and a Network Interface 625. In the illustrated embodiment, Processor 610 retrieves and executes programming instructions stored in Memory 615 as well as stores and retrieves application data residing in Storage 620. Processor 610 is representative of a single CPU, multiple CPUs, a single CPU having multiple processing cores, and the like. Memory 615 is generally included to be representative of a random access memory. Storage 620 may be a disk drive or flash-based storage device, and may include fixed and/or removable storage devices, such as fixed disk drives, removable memory cards, or optical storage, network attached storage (NAS), or storage area-network (SAN). In the illustrated embodiment, the Management Device 605 may be communicatively coupled with other devices through the Network Interface 625.

As illustrated, the Memory 615 includes a Management Application 630. The Management Application 630 is generally used to monitor inventory and drive optimal acquisitions, as will be described in more detail below. The Management Application 630 includes a Grouping Component 635, Forecast Component 640, Interplay Component 645, and Optimization Component 650. Further, as illustrated, the Storage 620 includes Historical Data 655, records of Inventory Products 660, and records relating to Vendor Products 665. In the illustrated embodiment, the Historical Data 655 includes data about the Inventory Products 660 over time, such as sales trends, return rates, prices, and the like. In one embodiment, each Inventory Product 660 is an apparel item that is in stock or inventory of a retailer, vendor, or other seller of apparel, whether between businesses or direct to customers. In one embodiment, the each record of Inventory Product 660 also includes an indication as to the quantity of that product that is currently in stock.

Similarly, each Vendor Product 665 is an apparel item that is available for purchase from a vendor (i.e., a supplier that provides apparel to the entity that stocks Inventory Products 660). For example, the Inventory Products 660 may correspond to inventory held by a boutique to be sold to customers, while the Vendor Products 665 correspond to apparel that the boutique can acquire from suppliers. In some embodiments, the Storage 620 also includes information about the corresponding vendors, such as their standing in the industry (e.g., how trustworthy they are, the quality of their apparel, etc.). In some embodiments, each record of Vendor Products 665 also includes information about fulfillment time (i.e., how long will it take for the acquisition to be processed and received), as well as the price the vendor is asking.

In an embodiment, the Grouping Component 635 processes each Inventory Product 660 to generate a corresponding f-score for each, and discretizes the f-scores to generate groups of similar Inventory Products 660, based on the generated f-scores (e.g., using one or more clustering algorithms). As discussed above, in an embodiment, each Inventory Product 660 is processed with one or more models (e.g., CNNs) that are specific to the corresponding apparel category. In one embodiment, the Grouping Component 635 may transmit images corresponding to each Inventory Product 660 to the Cognitive Device 105 for processing. In such an embodiment, the Cognitive Application 130 may generate the corresponding f-score and return the f-score to the Management Application 630. In some embodiments, one or more components of the Cognitive Application 130 may be available locally (e.g., on the Management Device 605), and f-scores can thereby be generated locally. In some embodiments, once an f-score has been generated for a product, the f-score is stored along with the corresponding Inventory Product 660 or Vendor Product 665 in Storage 620 for reference later. In some embodiments, this f-score may be refreshed periodically, upon triggering events (e.g., public events), or upon request in order to account for changing tastes.

In one embodiment, the Grouping Component 635 generates groups or clusters of Inventory Products 660 within each category. That is, in an embodiment, the Grouping Component 635 proceeds category-by-category, grouping Inventory Products 660 within each respective category based on their determined f-scores. For example, in such an embodiment, even if two products have identical or very similar f-scores, they will not be assigned to the same group if they belong to different categories of apparel.

In one embodiment, the Grouping Component 635 also processes each available Vendor Product 665 to generate corresponding f-scores for each. Similarly, in an embodiment, the Grouping Component 635 identifies one or more f-score groups that each Vendor Product 665 corresponds to, based on the determined categories and f-scores. In the illustrated embodiment, the Forecast Component 640 generally processes the Historical Data 655 to generate forecasts or estimates for each determined group of Inventory Products 660. For example, in an embodiment, the Forecast Component 640 identifies the sales trends of each Inventory Product 660 in a particular group, and aggregates this data to determine the trend of the particular group. In such a way, the Forecast Component 640 can estimate future trends for the fashion group (e.g., future demand and timing of inventory depletion). In an embodiment, these forecasts may help shape acquisition decisions. For example, if it is predicted that inventory of a particular Inventory Product 660 or group of products will be depleted within a week (based on the forecast), the user will likely wish to purchase additional apparel items that are similar to the identified product(s) (e.g., Vendor Products 665 that correspond to the group, based on the generated f-score).

In some embodiments, the Forecast Component 640 also receives information about public events and updates or generates predictions based on these events. In such an embodiment, upon determining that a public event has occurred, the Forecast Component 640 can retrieve and process one or more images associated with the event to identify corresponding groups of Inventory Products 660 that may be affected. For example, if a celebrity is spotted wearing a particular apparel item, demand for similar items may increase. The Forecast Component 640 may identify the affected group(s) by processing one or more images from the public event (e.g., images of the celebrity wearing the apparel) to generate an f-score, and determining the corresponding groups in inventory. In some embodiments, the Forecast Component 640 may further determine a lag or delay that will occur before the corresponding result on demand (either higher or lower demand, depending on the event and the details). For example, based on Historical Data 655, the Forecast Component 640 may determine that demand will spike within a few days, and adjust the forecast accordingly.

In the illustrated embodiment, the Interplay Component 645 processes the Historical Data 655 in order to determine interplay for each identified group. In one embodiment, this interplay may include interaction effects between Inventory Products 660 in the same group, as well as in different groups. Similarly, in one embodiment, the interaction effect can include interaction between Inventory Products 660 in entirely different categories. As an example of interaction within a group, an increase in demand/sales of black formal shoes may be related to a corresponding drop in demand/sales for navy formal shoes. As an example of interaction between groups in a single category, an increase in sales (as reflected in the Historical Data 655) of strapless dresses may correspond to a decrease in demand/sales of dresses with straps. As an example of interaction between entirely different categories, an increase in sales of black shoes may also correlate to an increase in sales of black pants. Of course, each of these examples is not intended to be limiting, and the actual interactions can be much more complex and subtle. Thus, in an embodiment, the Interplay Component 645 can identify these interactions, which can shape acquisition decisions. For example, if Vendor Products 665 corresponding to a particular f-score group are acquired, it may have a beneficial or detrimental effect on demand and sales for one or more other f-score groups. These interactions may be important to identify to determine which Vendor Products 665 to acquire.

In one embodiment, the Interplay Component 645 also determines the price elasticity of each identified f-score group (e.g., based on the elasticity of the corresponding Inventory Products 660). In an embodiment, the elasticity may be defined as the relationship between sales of the Inventory Product(s) 660 and the price(s) of the product(s). For example, based on the Historical Data 655, the Interplay Component 645 may determine how sales within an f-score group are affected by raising or lowering the price (i.e., whether they increase or decrease), as well as the magnitude of that change (i.e., how rapidly sales decrease or increase). This information can be utilized to help shape acquisition decisions, as will be discussed in more detail below.

In the illustrated embodiment, the Optimization Component 650 processes a variety of data to determine optimal acquisitions of Vendor Products 665. In one embodiment, the Optimization Component 650 processes one f-score group at a time to determine whether to acquire Vendor Product(s) 665 in that group, as well as the optimal quantity and price at which to buy and/or sell the Vendor Product(s) 665. In some embodiments, the Optimization Component 650 may process multiple f-score groups within a particular category simultaneously to ensure optimal acquisition decisions. In some embodiments, the Optimization Component 650 may process multiple categories simultaneously, to ensure that the generated acquisition decisions are optimized across multiple categories.

In an embodiment, the Optimization Component 650 may select one or more Vendor Product(s) 665 based on data about the corresponding f-score group. For example, the Optimization Component 650 may consider the f-score group's determined forecast (e.g., whether there is a projected gap between demand and inventory), price elasticity, interactions, and the like. In some embodiments, the Optimization Component 650 also considers information about the Vendor Products 665 and/or vendor. For example, in such an embodiment, the Optimization Component 650 may consider the rank or standing of each vendor, the fulfillment time for each Vendor Product 665, and the price of each. In this way, the Optimization Component 650 can select the best Vendor Product(s) 665 to fill any projected gaps between demand and supply in each f-score group.

In some embodiments, the Optimization Component 650 generates one or more optimized acquisition plans and provides a recommendation to the user (e.g., via a graphic user interface, email, text, and the like). In some embodiments, this recommendation may include a link or button to approve the recommendation (e.g., to purchase or offer to purchase the selected Vendor Product(s) 665 at the specified price). In some embodiments, the Management Application 630 may place automated orders based on the optimal acquisition determinations generated by the Optimization Component 650. Advantageously, the Management Application 630 makes acquisition determinations based on a cognitive understanding of the apparel items, and objective similarity between items based on quantitative f-scores.

In some embodiments, in addition to purchase decisions, the Management Application 630 may also drive design and manufacture decisions. For example, the Management Application 630 may identify a predicted gap in inventory for a particular f-score group, and find that no Vendor Products 665 can fill this gap in a satisfactory manner (e.g., because of sub-optimal price, design, timing, etc.). In such an embodiment, the Management Application 630 can therefore recommend and drive new product development and design to help satisfy future demand. In some embodiments, the Management Application 630 is further configured to recommend or control promotion or marketing of the Inventory Products 660. For example, upon determining that a particular f-score group is overstocked (e.g., that the current supply far outpaces demand), the Management Application 630 may recommend a price decrease, marketing program, and the like to help spur purchases. Similarly, in some embodiments, the Management Application 630 may recommend price changes (including increases) for current Inventory Products 660 to maximize profits.

Figure 7:
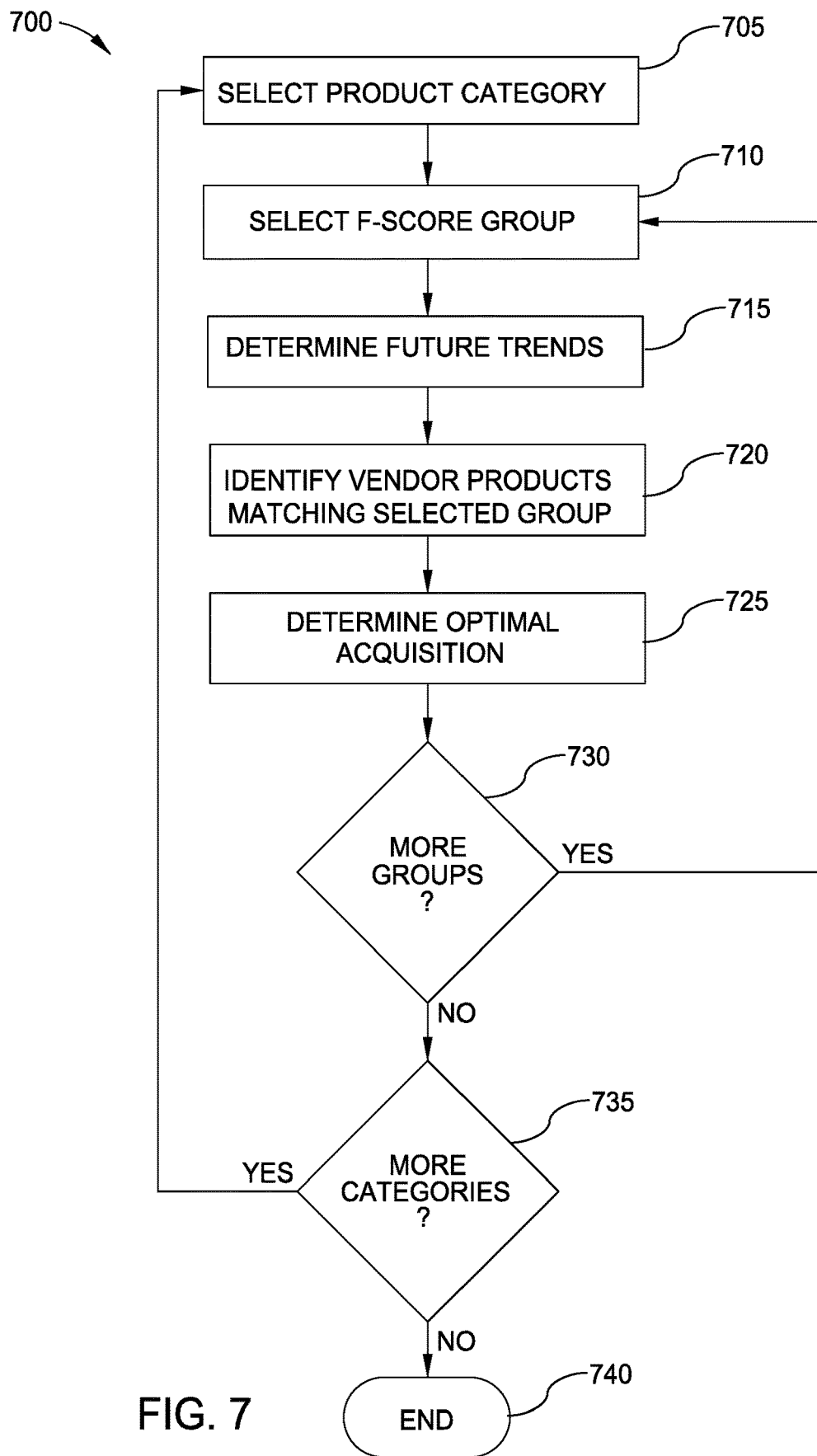
FIG. 7 is a flow diagram illustrating a method of determining optimal acquisitions, according to one embodiment disclosed herein.

FIG. 7 is a flow diagram illustrating a method 700 of determining optimal acquisitions, according to one embodiment disclosed herein. The method 700 begins at block 705, where the Management Application 630 selects a category of apparel products that are offered for sale (e.g., Inventory Products 660). The method 700 then proceeds to block 710, where the Management Application 630 selects an f-score group in the selected category. At block 715, the Management Application 630 determines future trends for the f-score group (e.g., by referring to Historical Data 655). At block 720, the Management Application 630 identifies one or more Vendor Products 665 that correspond to or match with the selected f-score group (which, in an embodiment, indicates that they can fill the same niche in inventory). The method 700 then proceeds to block 725, where the Management Application 630 determines an optimal acquisition. In various embodiments, this may include selecting one or more Vendor Products 665 to purchase, as well as an order quantity and price to buy and/or sell them for.

The method 700 then proceeds to block 730, where the Management Application 630 determines whether there are additional f-score groups in the category. If so, the method 700 returns to block 710 to select the next f-score group. If not, the method 700 proceeds to block 735, where the Management Application 630 determines whether additional apparel categories are yet to be processed. If so, the method 700 returns to block 705 to select an additional category. Otherwise, the method 700 terminates at block 740. In some embodiments, the optimal acquisitions for each f-score group or category may be further refined based on the optimal acquisition plans determined for other groups or categories.

Figure 8:
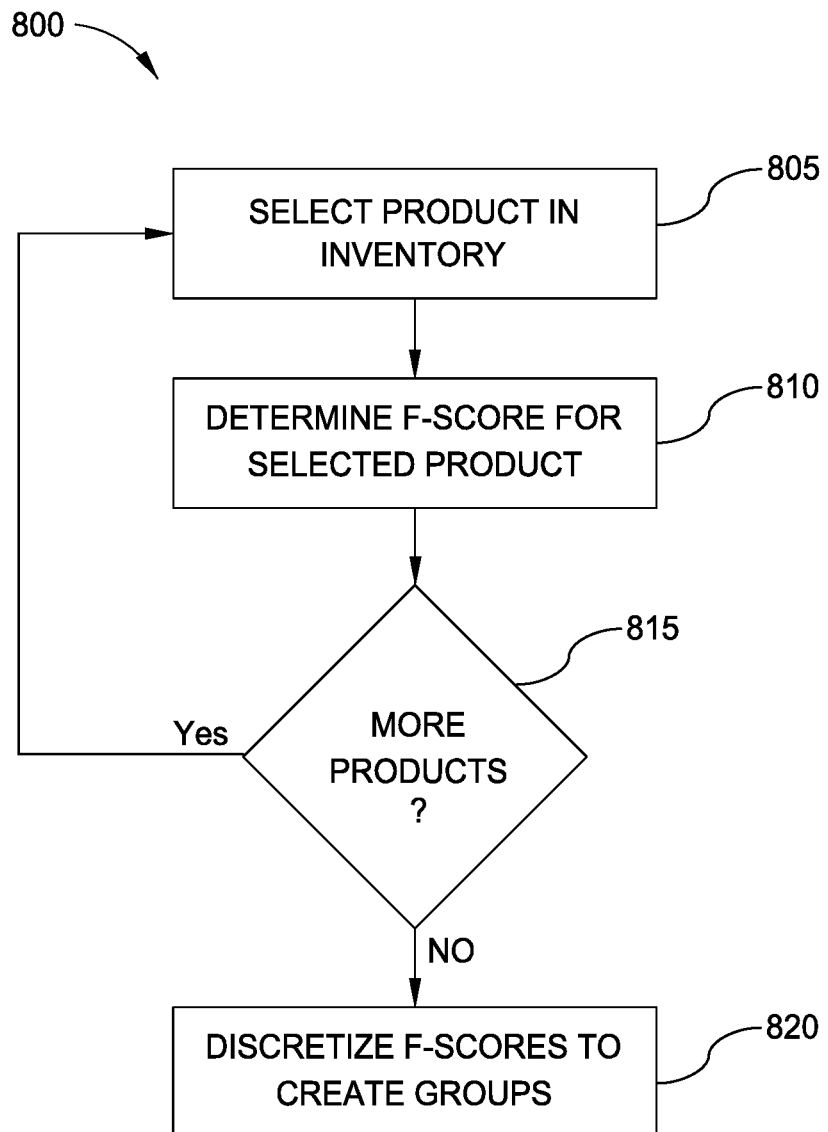
FIG. 8 is a flow diagram illustrating a method of classifying inventory, according to one embodiment disclosed herein.

FIG. 8 is a flow diagram illustrating a method 800 of classifying inventory, according to one embodiment disclosed herein. The method 800 begins at block 805, where the Management Application 630 (or more specifically, the Grouping Component 635) selects a first Inventory Product 660. At block 810, the Grouping Component 635 determines the f-score for the selected product. For example, in an embodiment, the Grouping Component 635 may provide one or more images associated with the Inventory Product 660 to the Cognitive Application 130 for processing with one or more CNNs. In some embodiments, this generated f-score is recorded in the Storage 620, linked to the Inventory Product 660. The method 800 then proceeds to block 815, where the Grouping Component 635 determines whether there are additional products in inventory that do not have an associated f-score. In some embodiments, this determination also includes determining whether any Inventory Products 660 have an outdated f-score. For example, in some embodiments, each Inventory Product 660 is reprocessed periodically to ensure the f-score is up to date. Similarly, in one embodiment, after a public event that may affect fashion, each Inventory Product 660 is re-processed.

If the Grouping Component 635 determines that additional Inventory Products 660 must be processed, the method 800 returns to block 805 to select the next product. Otherwise, the method 800 proceeds to block 820, where the Grouping Component 635 discretizes the f-scores to create a plurality of groups or clusters. For example, in one embodiment, the Grouping Component 635 may utilize one or more clustering algorithms to generate f-score clusters. In one embodiment, the Grouping Component 635 utilizes density-based methods or kernel density-based methods to discretize the f-scores. In one embodiment, the f-scores are vectors and are grouped based on their cosine similarity. As discussed above, in an embodiment, the f-score groups are created within each category. In such an embodiment, the Grouping Component 635 may proceed to perform the method 800 for each category, generating f-score clusters within each. In some embodiments, blocks 805, 810, and 815 may be performed such that all Inventory Products 660 are processed regardless of category, and block 820 (the discretizing operation) may be performed separately for each category.

Figure 9:
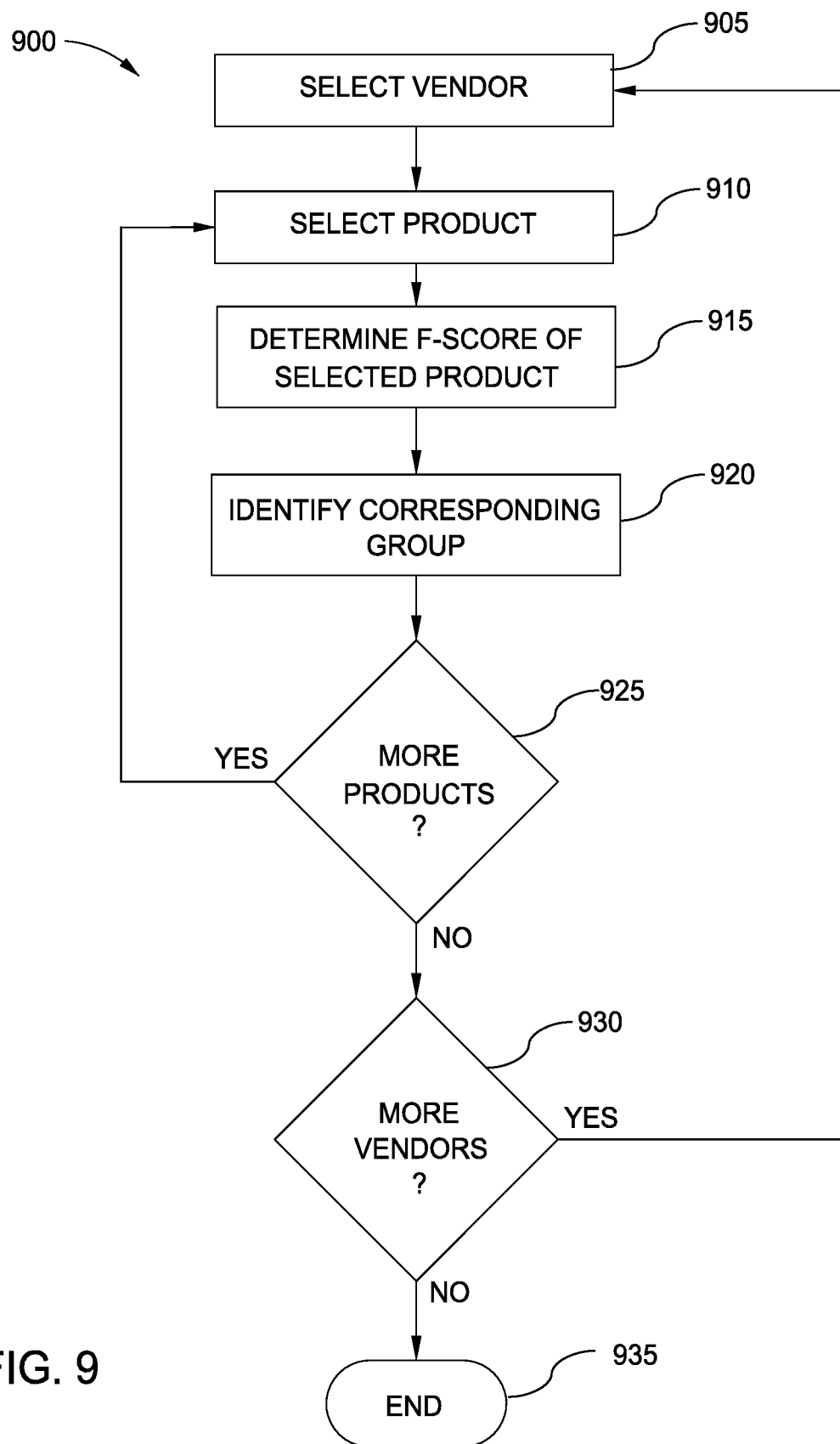
FIG. 9 is a flow diagram illustrating a method of classifying potential acquisitions, according to one embodiment disclosed herein.

FIG. 9 is a flow diagram illustrating a method 900 of classifying potential acquisitions, according to one embodiment disclosed herein. The method 900 begins at block 905, where the Grouping Component 635 selects a first vendor from a vendor list. At block 910, the Grouping Component 635 selects a first product (e.g., a Vendor Product 665) offered by the selected vendor. The method 900 then proceeds to block 915, where the Grouping Component 635 generates an f-score for the selected Vendor Product 665. For example, as discussed above, the Grouping Component 635 may retrieve an image associated with the Vendor Product 665 (e.g., from the vendor's website or from a web search) and transmit it to the Cognitive Application 130 for processing. In some embodiments, one or more of the vendors may provide the f-score of their products, just as they provide the price and availability. In such an embodiment, determining the f-score may comprise retrieving the f-score from the vendor website. In some embodiments, once the f-score has been determined, it is stored along with the record of the Vendor Product 665. Similarly, as discussed above in relation to the Inventory Products 660, in some embodiments, this f-score may be updated periodically, upon a given event, or upon request.

Once the Grouping Component 635 has determined the f-score for the selected Vendor Product 665, the method 900 proceeds to block 920, where the corresponding f-score group in inventory is identified. For example, in one embodiment, the cosine similarity between the f-score associated with the Vendor Product 665 may be computed for each f-score group or each Inventory Product 660 in each f-score group, in order to determine which group the Vendor Product 665 best matches. In this way, the Grouping Component 635 can determine which niche the Vendor Product 665 would fill in inventory, based on the corresponding f-score group. In an embodiment, this identified group is also associated with the Vendor Product 665 in Storage 620. The method 900 then proceeds to block 925, where the Grouping Component 635 determines whether there are additional products offered by the vendor that have not been processed. If so, the method 900 returns to block 910 to select the next product. If not, the method 900 proceeds to block 930 to determine whether there are additional vendors in the supplier list that have not yet been processed. If so, the method 900 returns to block 905 to select the next vendor. Otherwise, the method 900 terminates at block 935.

Figure 10:
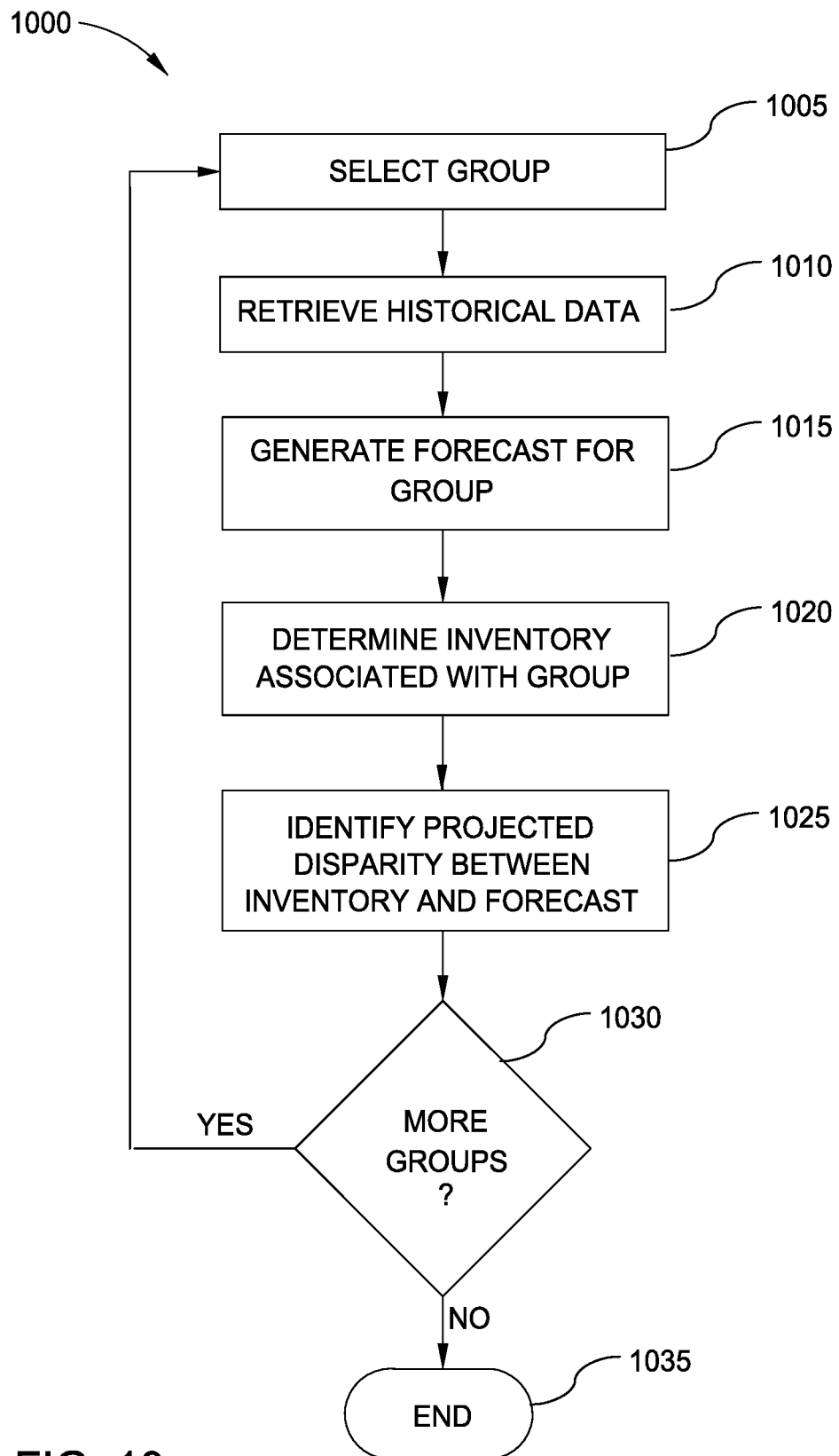
FIG. 10 is a flow diagram illustrating a method of estimating future inventory requirements, according to one embodiment disclosed herein.

FIG. 10 is a flow diagram illustrating a method 1000 of estimating future inventory requirements, according to one embodiment disclosed herein. The method 1000 begins at block 1005, where the Forecast Component 640 selects a first f-score group. At block 1010, the Forecast Component 640 generates a forecast for the selected group. As discussed above, this forecast may be based on Historical Data 655 relating to Inventory Products 660 that are included within the selected f-score group. For example, the Forecast Component 640 may predict future trends for each Inventory Product 660 in the particular f-score group, and aggregate these predictions to estimate the overall group's future trends. In this way, the Forecast Component 640 can estimate predicted trends in the sales of products with similar f-scores to the selected group. The method 1000 then proceeds to block 1020, where the Forecast Component 640 determines the current inventory associated with the selected group. For example, the Forecast Component 640 may determine how much stock is available for each of the Inventory Products 660 that are included within the selected group.

At block 1025, the Forecast Component 640 identifies any disparities between the inventory and forecast. For example, the Forecast Component 640 may identify a gap between inventory and estimated demand, such that at some point in the future, the supply will be exhausted. In some embodiments, the Forecast Component 640 may determine when these gaps are predicted to occur, as well as how significant they will be. In some embodiments, the Forecast Component 640 considers any standing contracts that may affect the disparity as well (e.g., deliveries that are already in processing). In some embodiments, in addition to determining gaps, the Forecast Component 640 may also determine surplus. For example, if the predicted future sales are expected to be below the available inventory, the Forecast Component 640 may identify this disparity as well. The method 1000 then proceeds to block 1030, where the Forecast Component 640 determines whether additional f-score groups remain to be processed. If so, the method 1000 returns to block 1005 to select the next group. If not, the method 1000 terminates at block 1035. Advantageously, the method 1000 allows the Management Application 630 to estimate how any particular Vendor Product 665 will sell, based on how well the corresponding f-score group is predicted to sell.

Figure 11:
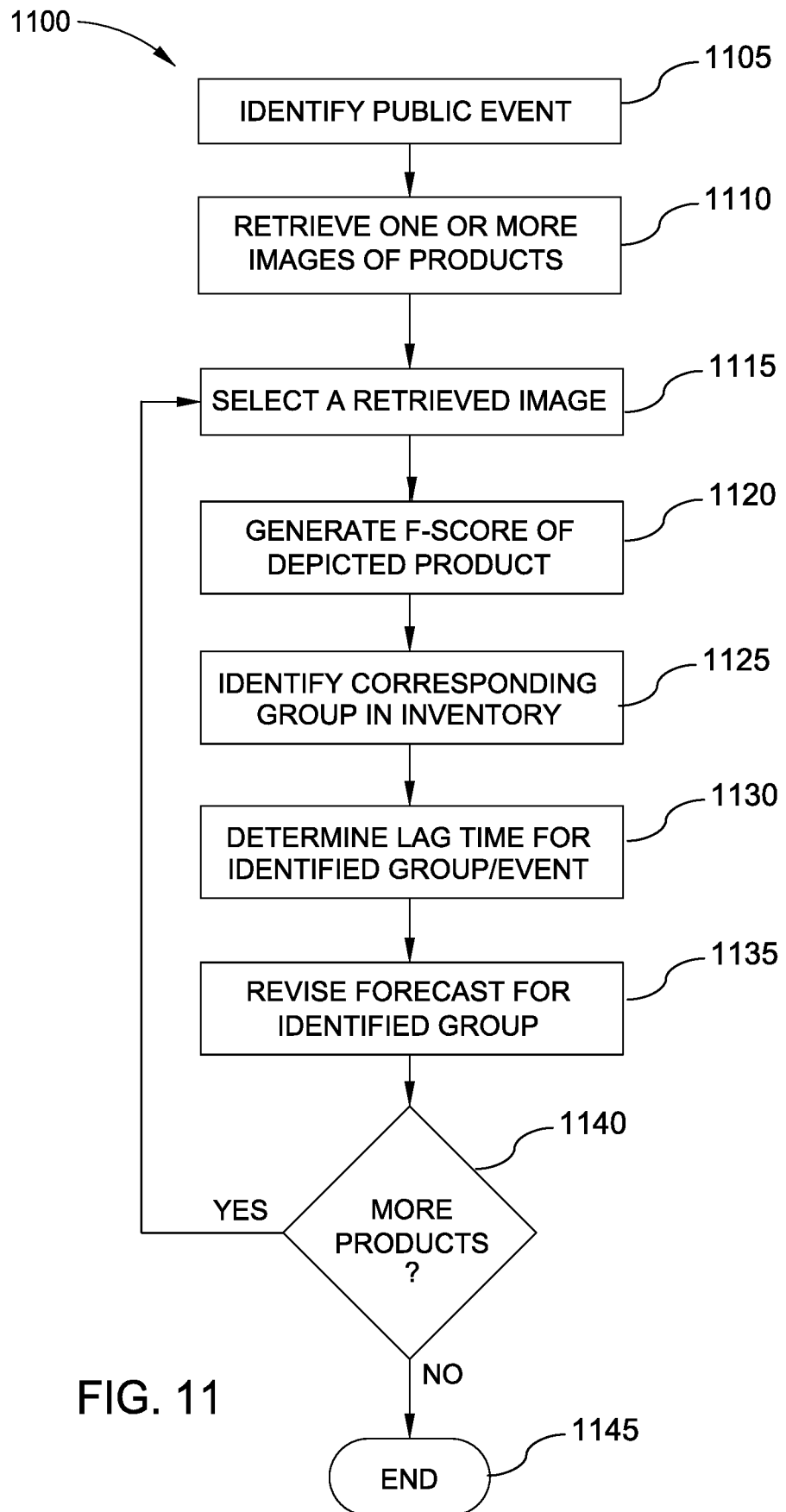
FIG. 11 is a flow diagram illustrating a method of estimating future inventory requirements, according to one embodiment disclosed herein.

FIG. 11 is a flow diagram illustrating a method 1100 of estimating future inventory requirements, according to one embodiment disclosed herein. The method 1100 begins at block 1105, where the Forecast Component 640 identifies a public event that has occurred or will occur. For example, the public event may be a movie, fashion show, television event, celebrity endorsement, publication, and the like. In an embodiment, the public event may generally be any event that may affect fashion trends or demand. For example, a character in a movie or show may cause demand to increase or decrease for similar apparel. When a public event is detected, the method 1100 proceeds to block 1110, where one or more images of the associated products or apparel are retrieved. For example, the Forecast Component 640 may retrieve images from the Internet, or may be provided such images by a user.

At block 1115, the Forecast Component 640 selects a first image or apparel item associated with the public event. At block 1120, the Forecast Component 640 generates an f-score for the apparel product depicted in the retrieved image(s). Of course, if multiple apparel items are included in the one or more images, an f-score can be generated for each item. As discussed above, generating the f-score may include processing the retrieved images by the Cognitive Application 130. At block 1125, the Forecast Component 640 identifies the corresponding group(s) in inventory for each of the apparel items based on the f-scores. This process may be similar to the process used to match Vendor Products 665 with f-score groups. The method 1100 then proceeds to block 1130, where the Forecast Component 640 determines a lag time for the identified f-score group and/or public event. For example, when an event occurs, the corresponding effect on demand and sales is often delayed somewhat. In some embodiments, the Forecast Component 640 determines this lag based on the Historical Data 655 and previous public events. That is, in an embodiment, the Forecast Component 640 identifies a prior public event that is similar to the present one, and determines the lag between the event and the corresponding change in sales.

At block 1135, the Forecast Component 640 determines a revised forecast for the identified f-score group(s). For example, in one embodiment, the Forecast Component 640 compares the present event to prior events and the resulting trends present in the Historical Data 655. Based on the similarity between the groups and events, the Forecast Component 640 can determine not only when the effect of the present event will be seen, but also the magnitude of the effect. In this way, the Forecast Component 640 can better predict future trends based on how popular culture affects demand. The method 1100 then continues to block 1140, where the Forecast Component 640 determines whether there are additional products involved or depicted in the event (e.g., whether there are additional received images) that have not yet been processed. If so, the method 1100 returns to block 1115 to select a received image corresponding to such product. Otherwise, the method 1100 terminates at block 1145.

Figure 12:
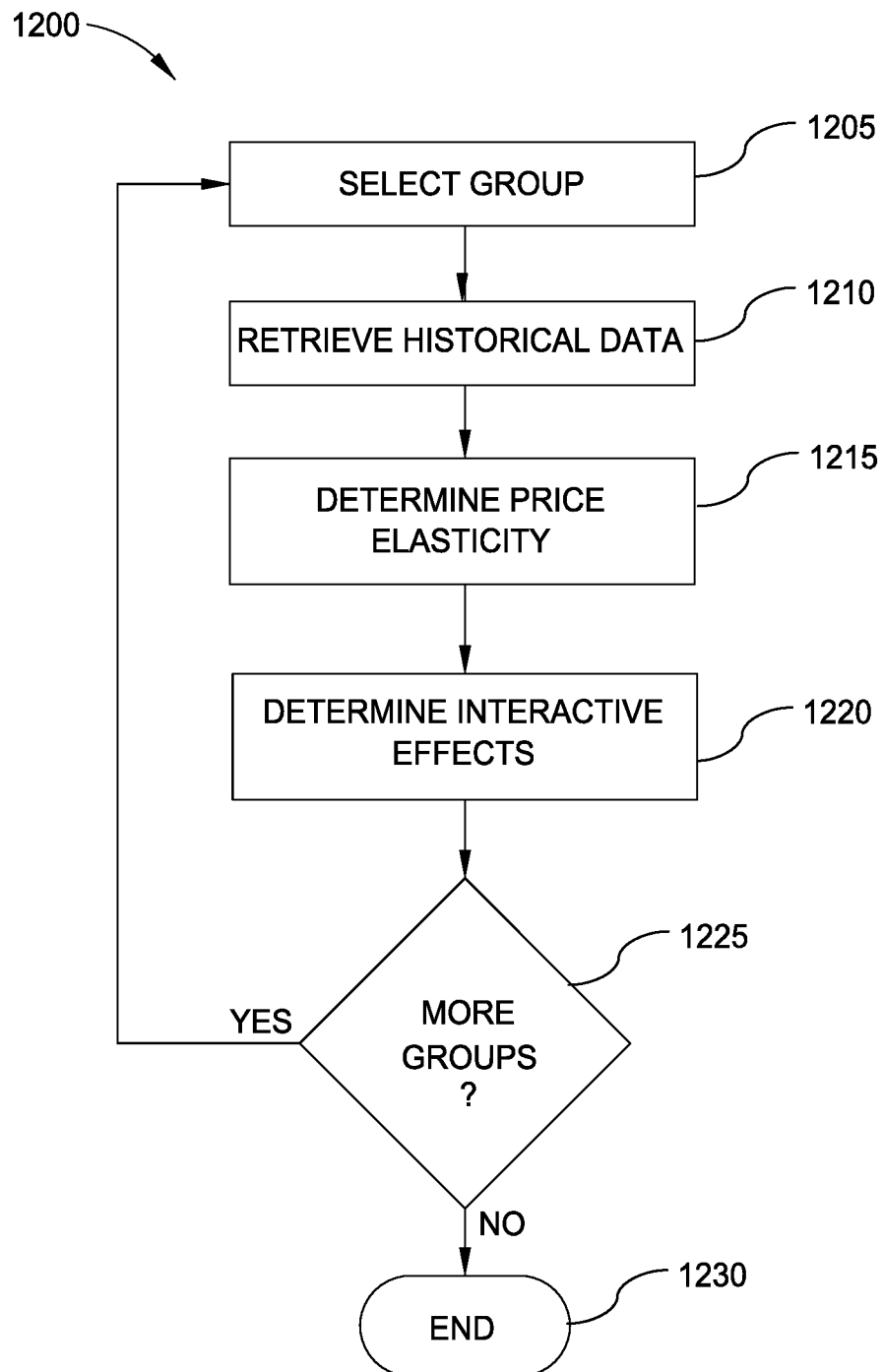
FIG. 12 is a flow diagram illustrating a method of analyzing interplay between potential acquisitions and current inventory, according to one embodiment disclosed herein.

FIG. 12 is a flow diagram illustrating a method 1200 of analyzing interplay between potential acquisitions and current inventory, according to one embodiment disclosed herein. At block 1205, the Interplay Component 645 selects a first f-score group. At block 1215, the Interplay Component 645 retrieves Historical Data 655 related to the selected group. For example, the Historical Data 655 may include historical sales trends for each Inventory Product 660 included within the f-score group. In some embodiments, the Interplay Component 645 also retrieves Historical Data 655 for other f-score groups and/or categories. The method 1200 then continues to block 1215, where the Interplay Component 645 determines price elasticity for the f-score group based on the Historical Data 655. For example, based on previous prices and sales of each Inventory Product 660 in the group, the Interplay Component 645 can determine the overall elasticity of items in the group. In an embodiment, each Vendor Product 665 is likely to exhibit similar price-elasticity as its corresponding f-score group.

The method 1200 then proceeds to block 1220, where the Interplay Component 645 determines interactive effects based on the Historical Data 655. For example, as discussed above, this may include interactions within an f-score group, between f-score groups, and/or between categories. In one embodiment, the interaction may be represented as a set of two or more groups or categories, and an indication as to the direction and magnitude of the interactive effect between them. Additionally, in some embodiments, the determined interaction includes a delay or lag that occurs between the cause and effect. As discussed above, these interactive effects can be determined by observing trends in the data for each f-score group, and identifying potential patterns or correlations with trends in other f-score groups. Advantageously, the effect that acquiring a particular Vendor Product 665 will have on existing sales or future sales can be estimated based on these determined interactions. The method 1200 then proceeds to block 1225, where the Interplay Component 645 determines whether additional groups remain to be processed. If so, the method 1200 returns to block 1205. If not, the method 1200 terminates at block 1230.

Figure 13:
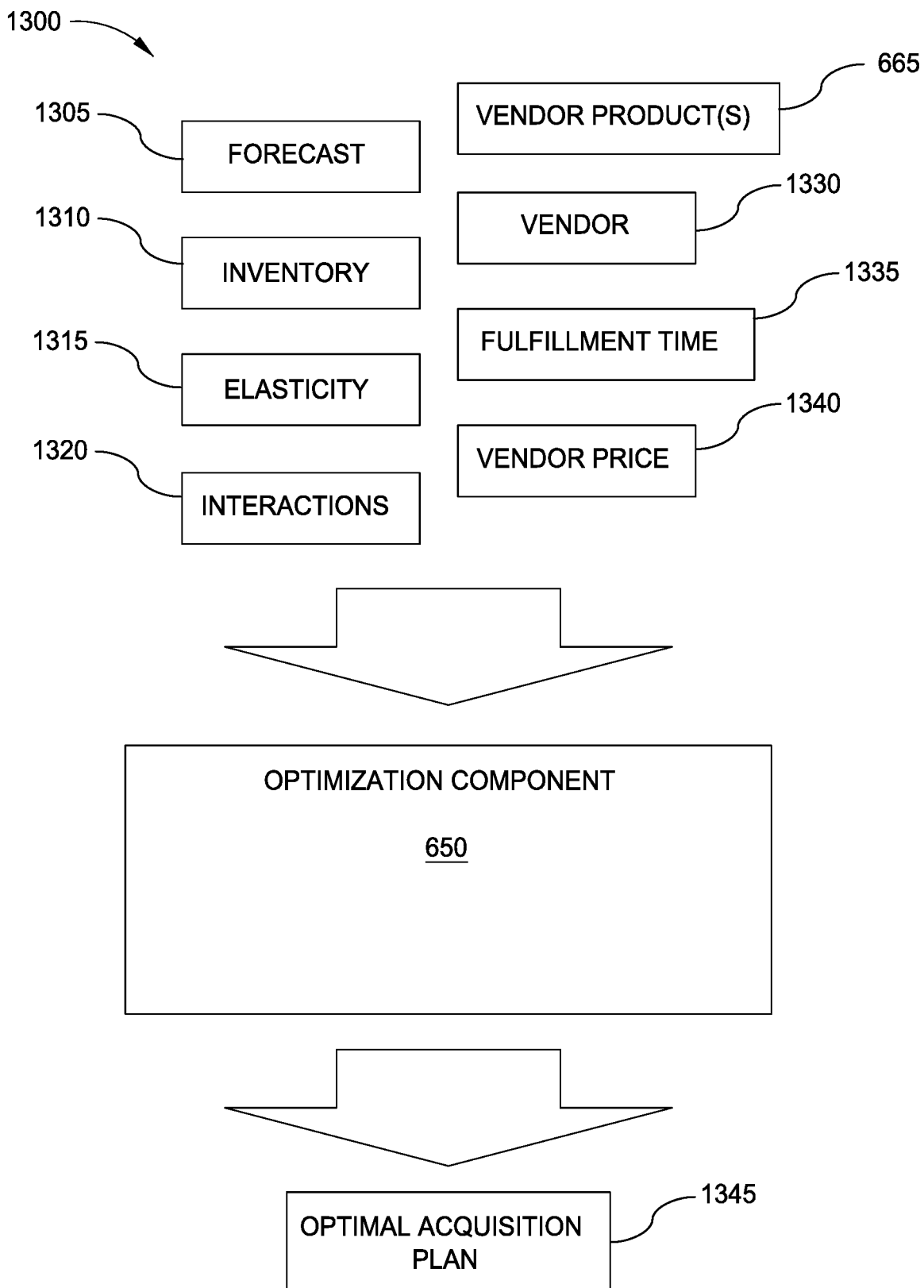
FIG. 13 illustrates a method of determining optimal acquisitions, according to one embodiment disclosed herein.

FIG. 13 illustrates a method 1300 of determining optimal acquisitions, according to one embodiment disclosed herein. In the illustrated embodiment, the Optimization Component 650 ingests various data about one or more f-score groups and Vendor Products 665, and generates one or more Optimal Acquisition Plans 1345. In one embodiment, the Optimization Component 650 processes each f-score group one at a time. In some embodiments, however, the Optimization Component 650 processes multiple f-score groups within a category at once. In some embodiments, the Optimization Component 650 processes f-score groups from different categories simultaneously, in order to ensure a holistic Optimal Acquisition Plan 1345 is generated. In the illustrated embodiment, the Optimization Component 650 utilizes the Forecast 1305 for each f-score group, as well as the current Inventory 1310 for the groups. Similarly, the Optimization Component 650 considers the determined Elasticity 1315 and Interactions 1320 of the f-score groups.

Additionally, as illustrated, the Optimization Component 650 ingests information about the particular the Vendor Product(s) 665 that are being considered. Furthermore, the Optimization Component 650 receives information about the Vendor(s) 1330 who will provide the products. In some embodiments, this may include a rank or other information about the Vendor 1330 indicating their trustworthiness, reliability, quality, and the like. Similarly, the Optimization Component 650 receives information about the Fulfillment Time 1335 for each Vendor Product 665, as well as the Vendor Price 1340 that will be charged for each product.

In one embodiment, the Optimization Component 650 may include one or more machine learning models that are trained to maximize profit based on these and other inputs. In some embodiments, the Optimization Component 650 utilize one or more optimization functions such as a maximization function to determine the optimal combination of Vendor Products 665 to order, as well as the optimal quantity and sale price to use. Regardless of the particular implementation, the Optimization Component 650 generates an Optimal Acquisition Plan 1345 which will maximize profits for the user (e.g., the store or vendor using the Management Application 630). In some embodiments, the Optimal Acquisition Plan 1345 includes an indication as to which products to order, as well as the quantity and price to order them at. In some embodiments, the Optimal Acquisition Plan 1345 also includes an indication as to the optimal sales price to use once the products are received. In some embodiments, the Optimal Acquisition Plan 1345 includes an indication regarding when the products should be purchased, and/or when they will be received.

As discussed above, in some embodiments, the Optimization Component 650 may present the Optimal Acquisition Plan 1345 to a user, who determines whether to follow all or some of it. In some embodiments, the Optimization Component 650 automatically initiates one or more purchases or orders to fulfill the plan. In one embodiment, the Grouping Component 635, Forecast Component 640, and Interplay Component 645 each generate a confidence measure to accompany their output, which indicates their confidence in the generated data. In a related embodiment, the Optimization Component 650 may also generate a confidence measure associated with the Optimal Acquisition Plan 1345. In one embodiment, this confidence measure is based at least in part on the confidence associated with the underlying data such as Forecasts 1305, Elasticity 1315, and Interactions 1320. In one embodiment, if the generated confidence measure exceeds a predefined threshold, the Optimization Component 650 may initiate automated purchases. If the confidence measure is below the threshold, however, the Optimization Component 650 may prompt the user or administrator to review the Optimal Acquisition Plan 1345 and decide whether to implement it.

Figure 14:
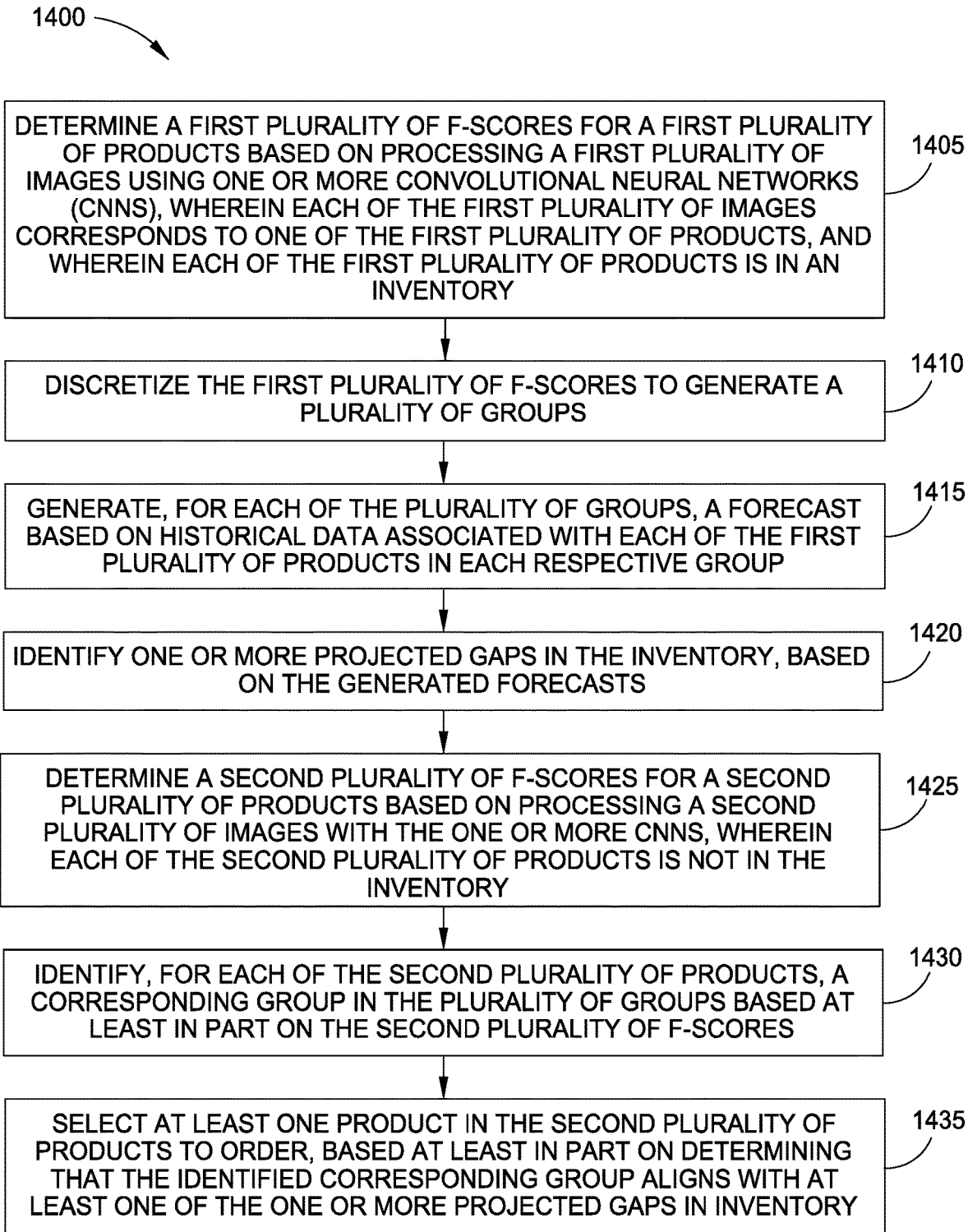
FIG. 14 is a flow diagram illustrating a method of determining optimal acquisitions, according to one embodiment disclosed herein.

FIG. 14 is a flow diagram illustrating a method 1400 of determining optimal acquisitions, according to one embodiment disclosed herein. The method 1400 begins at block 1405, where the Management Application 630 determines a first plurality of f-scores for a first plurality of products based on processing a first plurality of images using one or more convolutional neural networks (CNNs), wherein each of the first plurality of images corresponds to one of the first plurality of products, and wherein each of the first plurality of products is in an inventory. The method 1400 then proceeds to block 1410, where the Management Application 630 discretizes the first plurality of f-scores to generate a plurality of groups. At block 1415, the Management Application 630 generates, for each of the plurality of groups, a forecast based on historical data associated with each of the first plurality of products in each respective group. The method 1400 continues to block 1420, where the Management Application 630 identifies one or more projected gaps in the inventory, based on the generated forecasts. At block 1425, the Management Application 630 determines a second plurality of f-scores for a second plurality of products based on processing a second plurality of images with the one or more CNNs, wherein each of the second plurality of products is not in the inventory. At block 1430, the Management Application 630 identifies, for each of the second plurality of products, a corresponding group in the plurality of groups based at least in part on the second plurality of f-scores. Finally, at block 1435, the Management Application 630 selects at least one product in the second plurality of products to order, based at least in part on determining that the identified corresponding group aligns with at least one of the one or more projected gaps in inventory.

Figure 15:
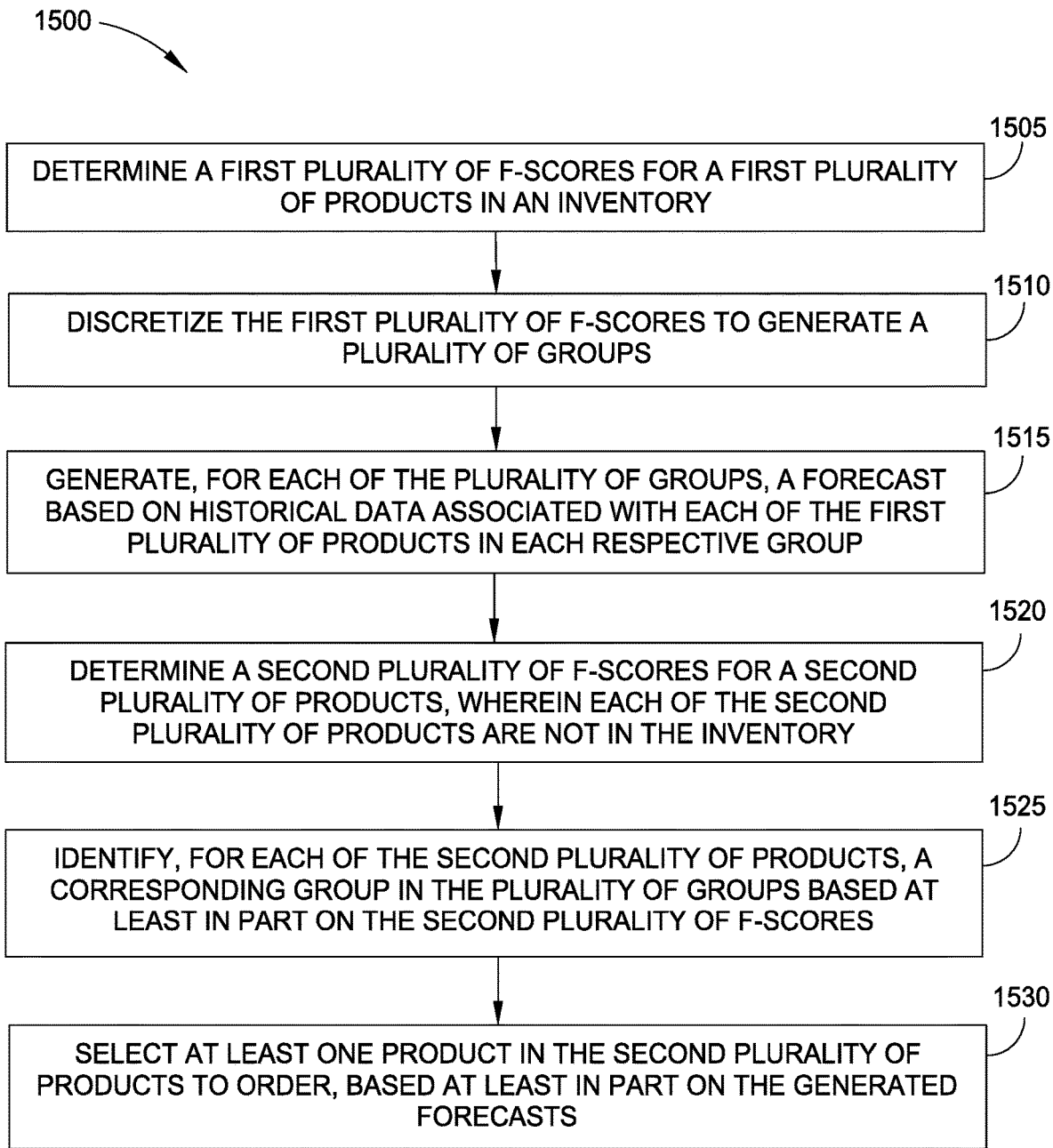
FIG. 15 is a flow diagram illustrating a method of determining optimal acquisitions, according to one embodiment disclosed herein.

FIG. 15 is a flow diagram illustrating a method 1500 of determining optimal acquisitions, according to one embodiment disclosed herein. The method 1500 begins at block 1505, where the Management Application 630 determines a first plurality of f-scores for a first plurality of products in an inventory. At block 1510, the Management Application 630 discretizes the first plurality of f-scores to generate a plurality of groups. The method 1500 then proceeds to block 1515, where the Management Application 630 generates, for each of the plurality of groups, a forecast based on historical data associated with each of the first plurality of products in each respective group. Further, at block 1520, the Management Application 630 determines a second plurality of f-scores for a second plurality of products, wherein each of the second plurality of products are not in the inventory. At block 1525, the Management Application 630 identifies, for each of the second plurality of products, a corresponding group in the plurality of groups based at least in part on the second plurality of f-scores. Finally, at block 1530, the Management Application 630 selects at least one product in the second plurality of products to order, based at least in part on the generated forecasts.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Cognitive Application 130 or related data available in the cloud. For example, the Cognitive Application 130 could execute on a computing system in the cloud and generate f-scores based on images. In such a case, the Cognitive Application 130 could train and use convolutional neural networks and store the CNNs and generated f-scores at a storage location in the cloud. Similarly, a user could access the Management Application 630 at a location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   determining, by one or more computer processors, a first plurality of f-scores for a first plurality of products based on processing a first plurality of images using one or more convolutional neural networks (CNNs), wherein each of the first plurality of images corresponds to one of the first plurality of products, wherein each of the first plurality of products is in an inventory, and wherein each of the first plurality of f-scores represent aggregated N-dimensional vectors corresponding to N fashion attributes and are used to compare the first plurality of products to determine their objective similarity based on the N fashion attributes;

discretizing, by the one or more computer processors, the first plurality of f-scores to generate a plurality of groups;

generating, by the one or more computer processors for each of the plurality of groups, a forecast based on historical data associated with each of the first plurality of products in each respective group;

identifying, by the one or more computer processors, one or more projected gaps in the inventory, based on the generated forecasts;

determining, by the one or more computer processors, a second plurality of f-scores for a second plurality of products based on processing a second plurality of images with the one or more CNNs, wherein each of the second plurality of products is not in the inventory;

identifying, by the one or more computer processors for each of the second plurality of products, a corresponding group in the plurality of groups based at least in part on the second plurality of f-scores;

selecting, by the one or more computer processors at least one product in the second plurality of products to order, based at least in part on determining that the identified corresponding group aligns with at least one of the one or more projected gaps in inventory; and initiating, by the one or more computer processors, an order for the selected at least one product in the second plurality of products.

2. The method of claim 1, wherein selecting at least one product in the second plurality of products is further based on one or more determined interaction effects between the first plurality of products, wherein the interaction effects are determined based on the associated historical data.

3. The method of claim 1, wherein selecting at least one product in the second plurality of products is further based on a determined price elasticity of the identified corresponding group of the at least one product, wherein the price elasticity of the corresponding group is determined based on the associated historical data.

4. The method of claim 1, wherein selecting at least one product in the second plurality of products is further based on a determined fulfillment time for the at least one product.

5. The method of claim 1, the method further comprising:

determining that at least one of the one or more projected gaps cannot be satisfactorily filled by the second plurality of products; and generating a recommendation to design and develop a new product that satisfies the at least one projected gap.

6. The method of claim 1, the method further comprising:

determining, based on the generated forecast, that at least one of the plurality of groups is a target for marketing efforts; and generating a recommendation to promote the determined group using a marketing campaign.

7. The method of claim 1, the method further comprising:

determining that a public event has occurred, wherein the public event involves a third plurality of products;

determining an f-score for each of the third plurality of products, based on processing a third plurality of images, wherein each of the third plurality of images corresponds to one of the third plurality of products;

identifying, for each of the third plurality of products, a corresponding group in the plurality of groups based on the third plurality of f-scores; and generating, for each of the plurality of groups, a revised forecast based at least in part on each identified corresponding group in the plurality of groups and further based on historical trends from one or more previous public events.

8. The method of claim 1, wherein selecting at least one product in the second plurality of products further comprises determining a quantity of the at least one product to order.

* * * * *